United States Patent
Quan et al.

(10) Patent No.: US 6,816,705 B1
(45) Date of Patent: Nov. 9, 2004

(54) SATELLITE COMMUNICATION SYSTEM AND METHOD

(75) Inventors: Philip Hon Nghia Quan, Surrey (GB); Richard Wyrwas, London (GB)

(73) Assignee: ICO Services Ltd., London (GB)

( * ) Notice: Subject to any disclaimer, the term of this patent is extended or adjusted under 35 U.S.C. 154(b) by 0 days.

(21) Appl. No.: 08/990,804

(22) Filed: Dec. 15, 1997

(30) Foreign Application Priority Data

Dec. 14, 1996 (GB) ............................................. 9626048

(51) Int. Cl.⁷ ............................................. H04B 7/185
(52) U.S. Cl. .................. 455/12.1; 455/427; 455/456.5; 342/357.1; 342/357.16
(58) Field of Search ............................. 455/12.1, 13.1, 455/427, 428, 429, 430, 456.1, 456.5; 342/354, 357, 352, 357.05, 357.1, 357.16, 357.17, 387, 357.07; 701/226, 300, 213, 214

(56) References Cited

U.S. PATENT DOCUMENTS

| | | | | |
|---|---|---|---|---|
| 3,384,891 A | * | 5/1968 | Anderson | 342/357.01 |
| 4,161,734 A | * | 7/1979 | Anderson | 342/352 |
| 4,359,733 A | * | 11/1982 | O'Neill | 342/36 |
| 4,740,792 A | * | 4/1988 | Sagey et al. | 342/457 |
| 5,099,245 A | * | 3/1992 | Sagey | 342/357.01 |
| 5,225,842 A | * | 7/1993 | Brown et al. | 342/357.09 |
| 5,412,389 A | | 5/1995 | Olds | 342/357 |
| 5,500,648 A | * | 3/1996 | Maine et al. | 455/13.2 |
| 5,515,062 A | * | 5/1996 | Maine et al. | 342/457 |
| 5,543,813 A | * | 8/1996 | Araki et al. | 342/357.16 |
| 5,548,801 A | * | 8/1996 | Araki et al. | 455/13.1 |
| 5,551,059 A | | 8/1996 | Hutcheson et al. | |
| 5,552,795 A | | 9/1996 | Tayloe et al. | |
| 5,592,175 A | * | 1/1997 | Tayloe | 455/12.1 |
| 5,828,957 A | * | 10/1998 | Kroeger et al. | 455/428 |
| 5,838,668 A | * | 11/1998 | Okada et al. | 455/12.1 |
| 5,884,142 A | * | 3/1999 | Wiedeman et al. | 455/12.1 |
| 5,907,809 A | * | 5/1999 | Molnar et al. | 455/456.2 |
| 5,920,284 A | * | 7/1999 | Victor | 455/12.1 |
| 6,020,847 A | * | 2/2000 | Upton et al. | 342/357.16 |
| 6,028,883 A | * | 2/2000 | Tiemann et al. | 375/150 |

FOREIGN PATENT DOCUMENTS

| | | |
|---|---|---|
| EP | 0 655 871 A1 | 5/1995 |
| EP | 0 803 742 A2 | 10/1997 |
| EP | 0 808 034 A2 | 11/1997 |
| EP | 0 845 874 A2 | 6/1998 |
| WO | WO 82/01076 | 4/1982 |
| WO | WO 91/08622 | 6/1991 |

* cited by examiner

*Primary Examiner*—Charles Appiah
(74) *Attorney, Agent, or Firm*—Michael J. Donohue; Davis Wright Tremaine LLP

(57) ABSTRACT

A satellite communications system and method, where a satellite 10 can pass messages between a user terminal 44 and an earth station 38, as the satellite moves in an orbit 12 12' as indicated by arrow 46, comprises means for measuring the position of the user terminal 44, on the surface of the earth 14, relative to the nadir 50, by means of doppler shift measurements and propagation delay measurements between the satellite 10 and the user terminal 44. Where more than one satellite 10 is visible to the user terminal 44, combination means are employed using propagation delays to plural satellites 10, and/or recordal of the receipt times, by the user terminal 44, of timed broadcasts from one or more satellites 10 to determine the propagation delay between the one or more satellites 10 and the user terminal 44.

11 Claims, 15 Drawing Sheets

SATELLITE COMMUNICATION SYSTEM AND METHOD

The present invention relates to satellite communication systems, and a method of operating such systems. The invention particularly relates to satellite communication systems and related methods where an earth based user terminal communicates with a satellite which in turn communicates with an earth station, and vice versa. Most particularly, the present invention relates to such a system and its related methods where there is a requirement for the location of the user terminal, on the surface of the earth, to be known to the earth station.

It is known, in a satellite communications system, for a user terminal, perhaps in the form of a radio telephone handset, not dissimilar to a cellular radio telephone handset, to communicate with an earth station, via a satellite, to establish a telephone call or to receive a telephone call, by means of the earth station linking into the terrestrial wire and cable system or into another radio telephone system.

There are twin purposes relating to establishing the exact position of the user terminal on the surface of the earth. Firstly, in order to know how to direct a radio signal to or from a user terminal, when required, from particular satellite at a particular time, it is necessary to know the approximate location of the user terminal so that the appropriate beam from the appropriate satellite can be selected to cover the portion of the Earth's surface where the user terminal is located. Secondly, in a satellite communication system, in order that call barring, local billing or other restrictions based on the territory wherein the user terminal may be operated can be observed, it is necessary to determine the location of the user terminal with sufficient accuracy for the necessary restrictions to be imposed.

It is known to provide a user terminal where the individual terminal employs "Global Positioning by Satellite" (GPS) to determine, with some great accuracy, the position of the user terminal on the surface of the earth. The user terminal then transmits, to the earth station, via the satellite or satellites involved in communications, its exact position which is then used by the earth station, in subsequent interactions with the user terminal, to control the fiscal and mechanical aspects of the communication activity with the user terminal. An example of such a system is to be found in European Patent EP 0562 374 by Motorola Corporation filed 27th Mar. 1993.

Such systems require multiple frequency capability from the handset, together with enhanced complication of the handset, in order that the handset may be capable both of communications and of GPS measurements.

It is advantageous, therefore, to provide a system and method whereby the position, on the surface of the earth, of the user terminal or handset can be determined with sufficient accuracy for communication and fiscal purposes without undue complication of the handset or user terminal and without the necessity of the provision of or access to a separate satellite system concerned with GPS.

The present invention seeks to provide a solution to the problem of determining the location of a user terminal or handset, on the surface of the earth, when interacting with a satellite communication system, without the necessity to resort to a solution involving GPS and with sufficient accuracy for the operational and fiscal requirements of a satellite communication system.

In another system, it is merely necessary for the satellite to receive a transmission from the user terminal, in response to the earth station, via the satellite, requesting radio communication from the user terminal, for the earth station to use the delay in response from the user terminal for ranging purposes and to use the doppler shift on the received frequency from the user terminal, together with a foreknowledge of the position and velocity of the satellite, to determine, with a certain degree of precision, the position of the user terminal on the surface of the earth.

Unfortunately, if the cost of the user terminal is to be kept at realistic limits, consistent with the trade in handheld mobile radio telephones, the accuracy of the crystal clock or other frequency source within the user terminal cannot be made consistent with sufficient accuracy of determination of the position of the user terminal, on the surface of the earth, for the functional and fiscal aspects connected with operation of a satellite telephone communication system.

The present invention seeks to provide a method and system whereby the position of a user terminal, on the surface of the earth, can rapidly be determined without multiple frequency capability in the user terminal and with a high degree of accuracy.

According to one aspect, the present invention consists in a satellite communications system wherein a user terminal is operative to transmit to one or more satellites and wherein each of said one or more satellites is operative to transmit to said user terminal, each of said one or more satellites being operative to send and receive signals from an earth station: said system being characterised by said earth station being operative to exchange signals with said user terminal through said satellites and thereafter, being operative to analyse said signals to determine the position of said user terminal on the surface of the earth.

According to a second aspect, the present invention consists in a method for determining the position of a user terminal on the surface of the earth by employing one or more satellites each operative to send and receive messages from an earth station and each operative to send and receive messages, from said earth station, to said user terminal, said method being characterised by the steps of: said earth station exchanging messages, via said one or more satellites, with said user terminal and, therafter, said earth station analysing said returned messages to determine the position of the user terminal.

The invention further provides a method and system wherein, when said one or more satellites comprises just one satellite, said exchanged messages between said user terminal and said ground station are adapted to measure the doppler shift due to motion of said one satellite relative to said user terminal and to measure the radio propagation delay between said ground station and said user terminal.

The invention further provides a method and system wherein said just one satellite is operative to communicate with said user terminal using one out of a plurality of beams, each of said plurality of beams being interactive with a respective one out of a plurality of areas on the surface of the earth, ambiguity of position of said user terminal being resolved by observation of with which out of said plurality of beams said user terminal exchanges said signals.

The invention yet further provides a method and system wherein, when said one or more satellites comprises more than one satellite, said exchanged signals between said earth station and said user terminal are adapted to measure the propagation delay between said earth station and said user terminal via each of said more than one satellites.

The invention still further provides a method and system wherein each of said more than one satellites is operative to provide a broadcast message at a predetermined time, and wherein said user terminal is operative to measure and record the time of arrival of each of the broadcast messages and to report back to said earth station said time of arrival of said each of said broadcast messages.

The invention still further provides a method and system wherein said earth station is operative to send out a message, via each of said more than one satellites, and where said user terminal is operative to return a message within a predetermined time of receipt of said message via each of said more than one satellite, said earth station being operative thereby to calculate the propagation delay between said earth station and said user terminal via each of said more than one satellites.

The present invention still further provides a method and system wherein said earth station is operative to send said message via said each of said more than one satellites an optimum number of times, dependently upon the estimated position of said user terminal with respect to said each of said more than one satellites, and to take the average of the propagation delays derived therefrom.

The present invention yet further provides a method and system wherein said user terminal is operative to detect and record the time of arrival of broadcast messages from satellites which are no longer in sight and to report said previous broadcast messages to said earth station, said earth station using knowledge of the position of said satellites, no longer in sight, at the time of receipt of the broadcast message by said user terminal to assist in the calculation of the position of said user terminal.

The present invention still further provides a method and system wherein said user terminal is operative to note the apparent recorded time, reported by said user terminal, between two known intervals and is operative thereby to correct for drift and offset error in the timer in said user terminal.

The present invention further provides a method and system wherein said earth station is operative to send a signal at a known frequency to said satellite and wherein said satellite is operative to use an internal oscillator to transpose said signal of a known frequency and return the transposed signal to said earth station on a plurality of other frequencies, said earth station being operative to measure the other frequencies and to derive therefrom the doppler shift between said earth station and said satellite and to derive the error in the internal oscillator in said satellite.

The present invention further provides a method and system wherein said user terminal is operative to eliminate error in its own internal oscillator by employing said internal oscillator to convert the frequency of a signal, received from said satellite, in a first direction, and thereafter to convert the frequency of said signal in a second direction, opposite to said first direction, thereby eliminating error in said internal oscillator.

The present invention still further provides a method and system wherein said earth station is operative to exchange said messages with said user terminal, via said just one satellite, a first optimum number of times to establish, by averaging, said doppler shift and a second optimum number of times to establish, by averaging, said propagation delay, said in orthogonal orbital plains. First and second optimum number of times being dependent upon the estimated position of said user terminal with respect to said just one satellite.

The invention is further explained, by way of example, by the following description, taken in conjunction with the appended drawings, in which.

Figure 1:
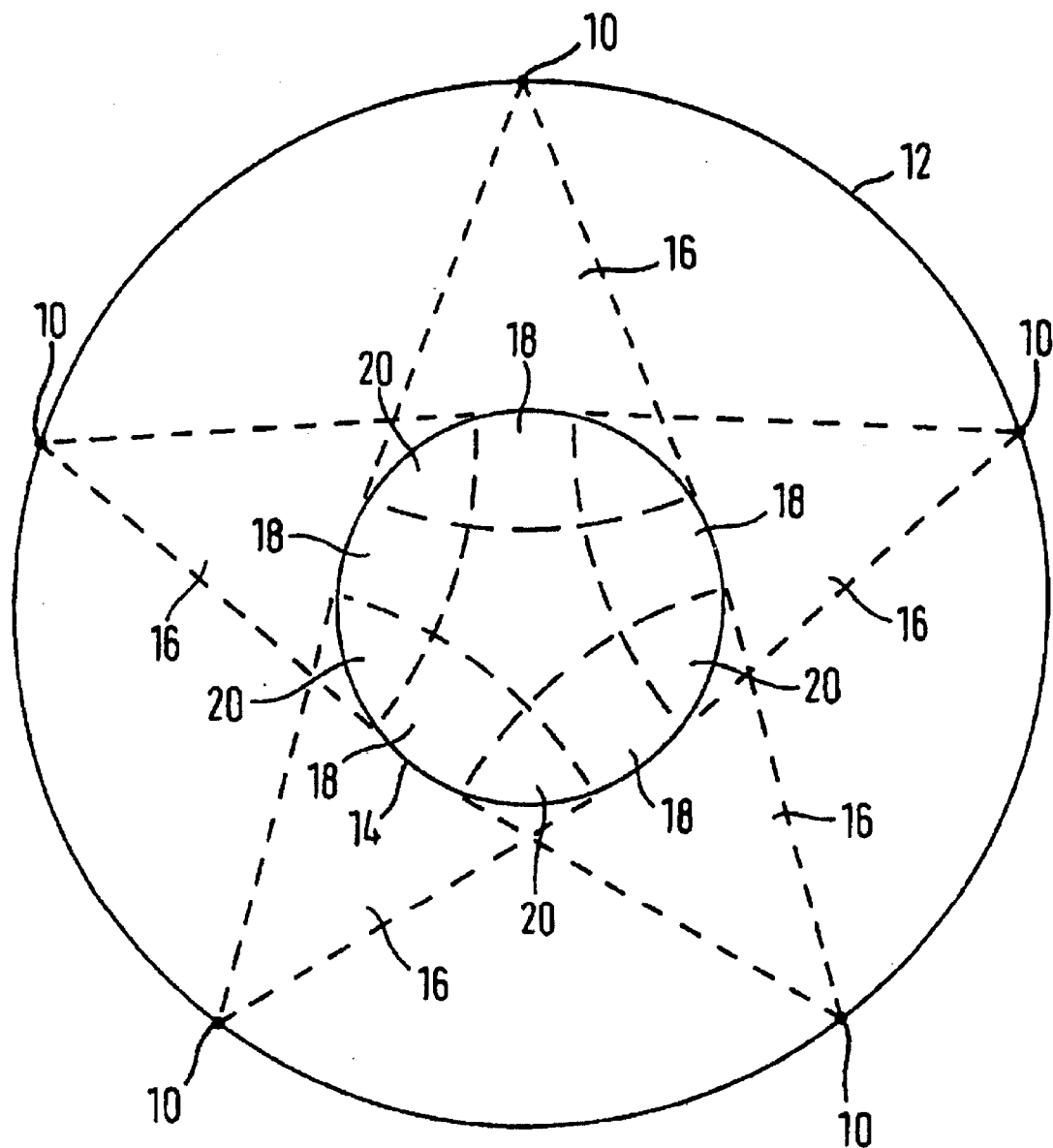
FIG. 1 shows a planar constellation of satellites disposed about the earth.

Attention is firstly drawn to FIG. 1.

FIG. 1 shows a planar constellation of satellites disposed about the earth.

The plurality of satellites 10 are evenly disposed around a circular orbit 12 above the surface of the earth 14. Each of the satellites 10 is designed to provide radio communications with apparatus on the surface to the earth 14 when the individual satellite 10 is more than 10 degrees above the horizon. Each satellite 10 therefore provides a cone 16 of radio coverage which intersects with the surface of the earth 14.

The surface of the earth has three types of areas. A first type of area 18 is one which has radio coverage from only one satellite 10. A second type of area 20 is an area where there is radio coverage from more than one satellite 10. Finally, a third type of area 22 receives radio coverage from none of the satellites 10 in the orbit 12 shown.

Figure 2:
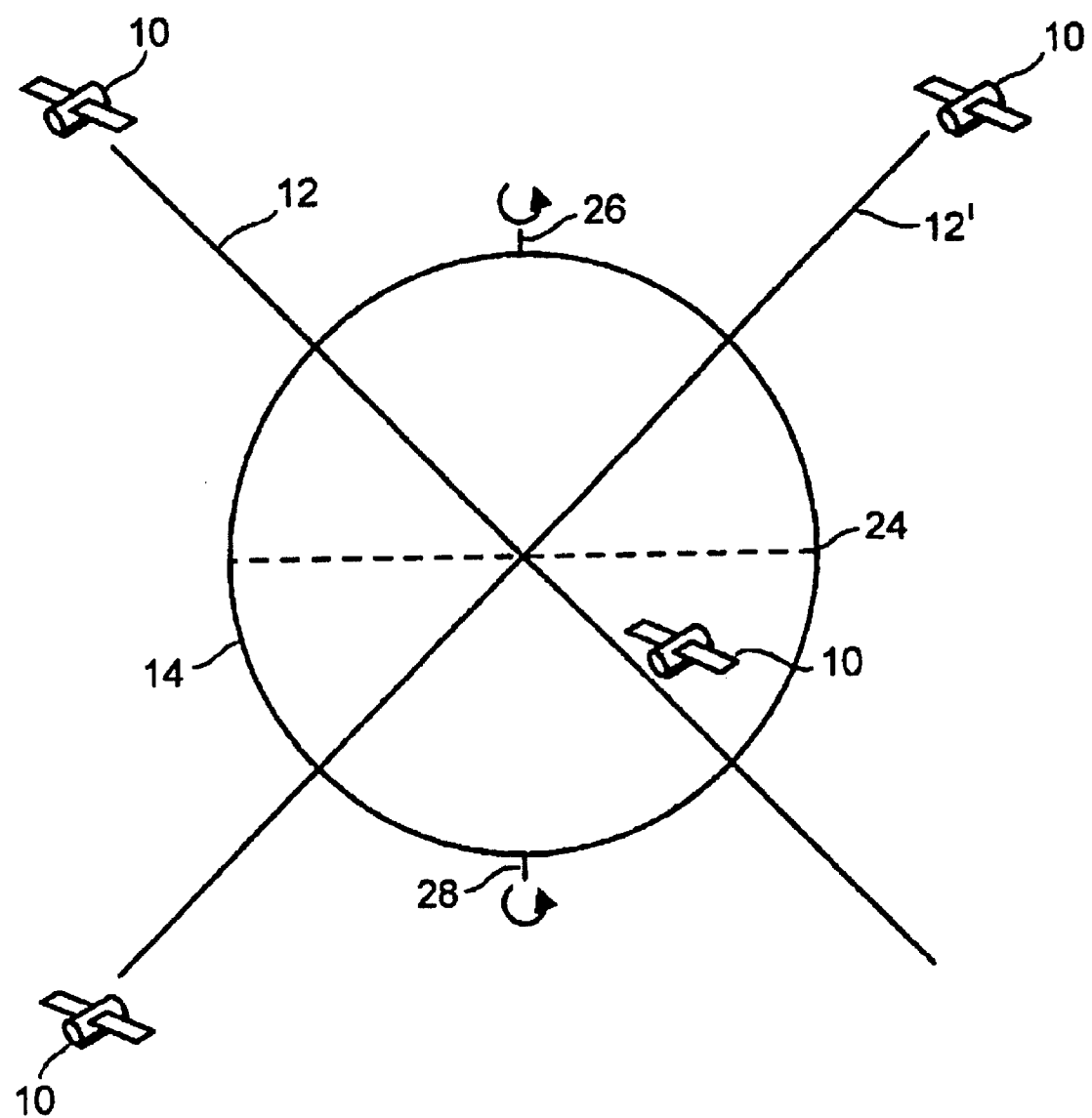
FIG. 2 illustrates how the satellites are disposed in orthogonal orbital planes.

FIG. 2 illustrates how the satellites 10 are disposed in orthogonal orbital planes.

The first orbit 12 of FIG. 1 is supplemented by a second orbit 12' having satellites 10 disposed there about in a similar manner to that shown in FIG. 1. The orbits 12' are orthogonal to one another, each being inclined at 45 degrees to the equator 24 and having planes which are orthogonal (at 90 degrees ) to each other.

In the example shown, the satellites 10 orbit above the surface of the earth 14 at an altitude of 10 500 km. Those skilled in the art will be aware that other orbital heights and numbers of satellites 10 may be used in each orbit 12, 12', This configuration is preferred because the example provides global radio coverage of the earth 14, even to the north 26 and south 28 poles, with a minimum number of satellites 10. In particular, the orthogonality of the orbits ensures that the satellites 10 of the second orbit 12' provides radio coverage for the third types of area 22 of no radio coverage for the satellites in the first orbit 12, and the satellites 10 in the first orbit 12 provide radio coverage for those areas 22 of the third type where the satellites 10 of the second orbit 12' provide no radio coverage.

It will become clear that, although the two orbits 12, 12' are here shown to be of the same radius, the invention as hereinbefore and hereinafter described will function with orbits 12, 12' of different radii. Equally, there may be more than two orbits 12, 12'. So far as the present invention is concerned, the only requirement is that every part of the surface of the earth 14 is in receipt of radio coverage from at least one satellite 10 at all times.

Figure 3:
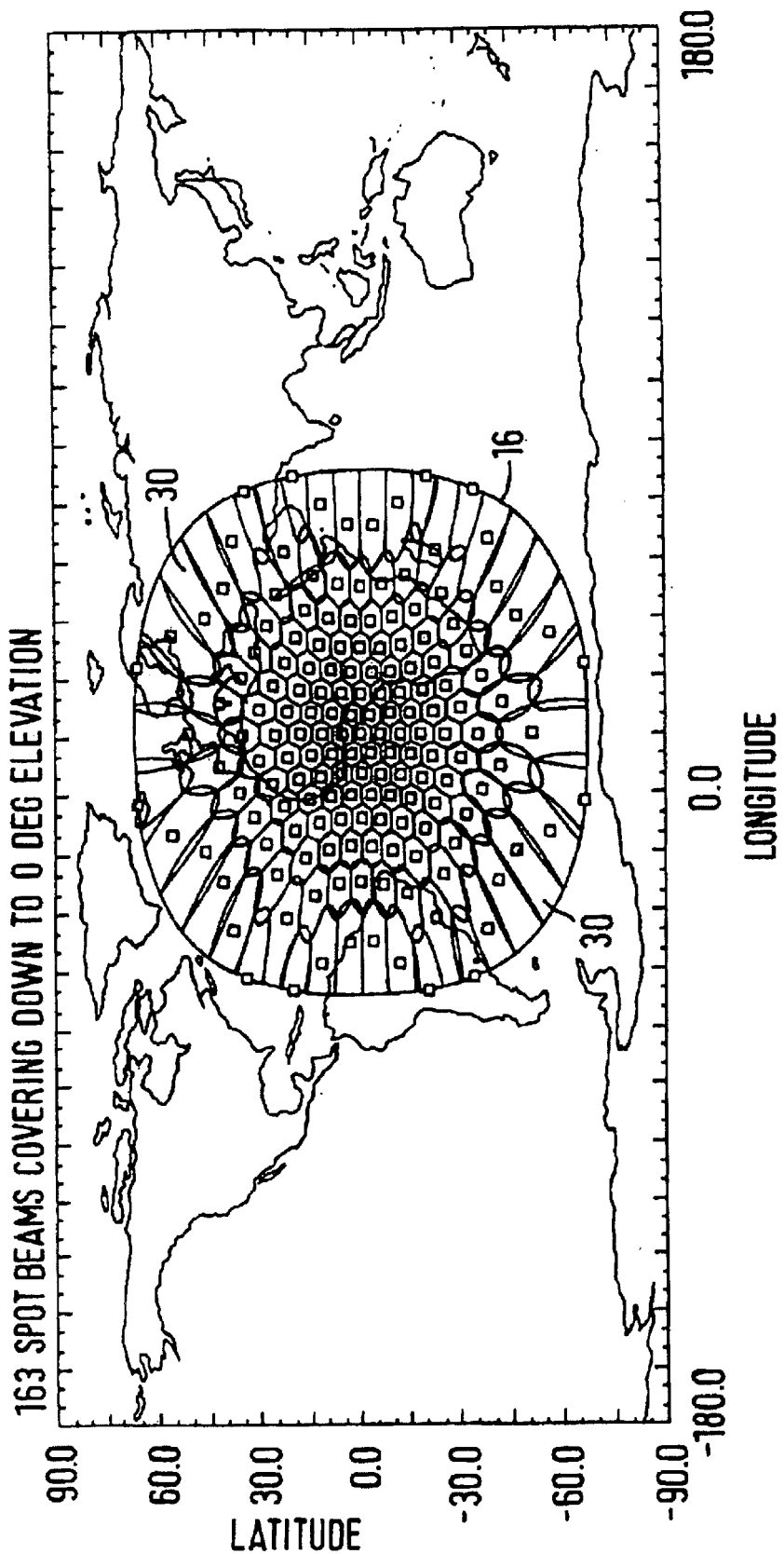
FIG. 3 shows the structure of the cone of radio coverage provided by each satellite.

FIG. 3 shows the structure of the cone 16 of radio coverage provided by each satellite 10. For convenience, the radio coverage cone 16 is shown centred, on a map of the earth, at latitude 0 degrees at longitude 0 degrees. The cone 16 of radio coverage is divided into a plurality of spot beams 30, by means of a corresponding plurality of directional antennae on the satellite 10. The satellite 10 is intended for mobile radio telephone communications and each of the spot beams 30 corresponds, roughly, to the equivalent of a cell in a cellular radio telephone network. In FIG. 3, the cone of radio coverage 16 is distorted due to the geometry of the map of the earth's surface provided. FIG. 3 also shows the extent of interaction of the cone 16 of radio coverage down to the edges of the cone 16 being tangential to the earth's surface, that is, to the point where the cone 16 represents a horizontal incidence at its edges, with the surface of the earth. By contrast, FIG. 1 shows the cone 16 at a minimum of 10 degrees elevation to the surface of the earth.

It is to be observed, that because of the curvature of the earth, the spot beams 30 are of near uniform, slightly overlapping circular shape at the centre whereas, at the edges, the oblique incidences of the spot beams 30 onto the surface of the earth 14 causes considerable distortion of shape.

Figure 4:
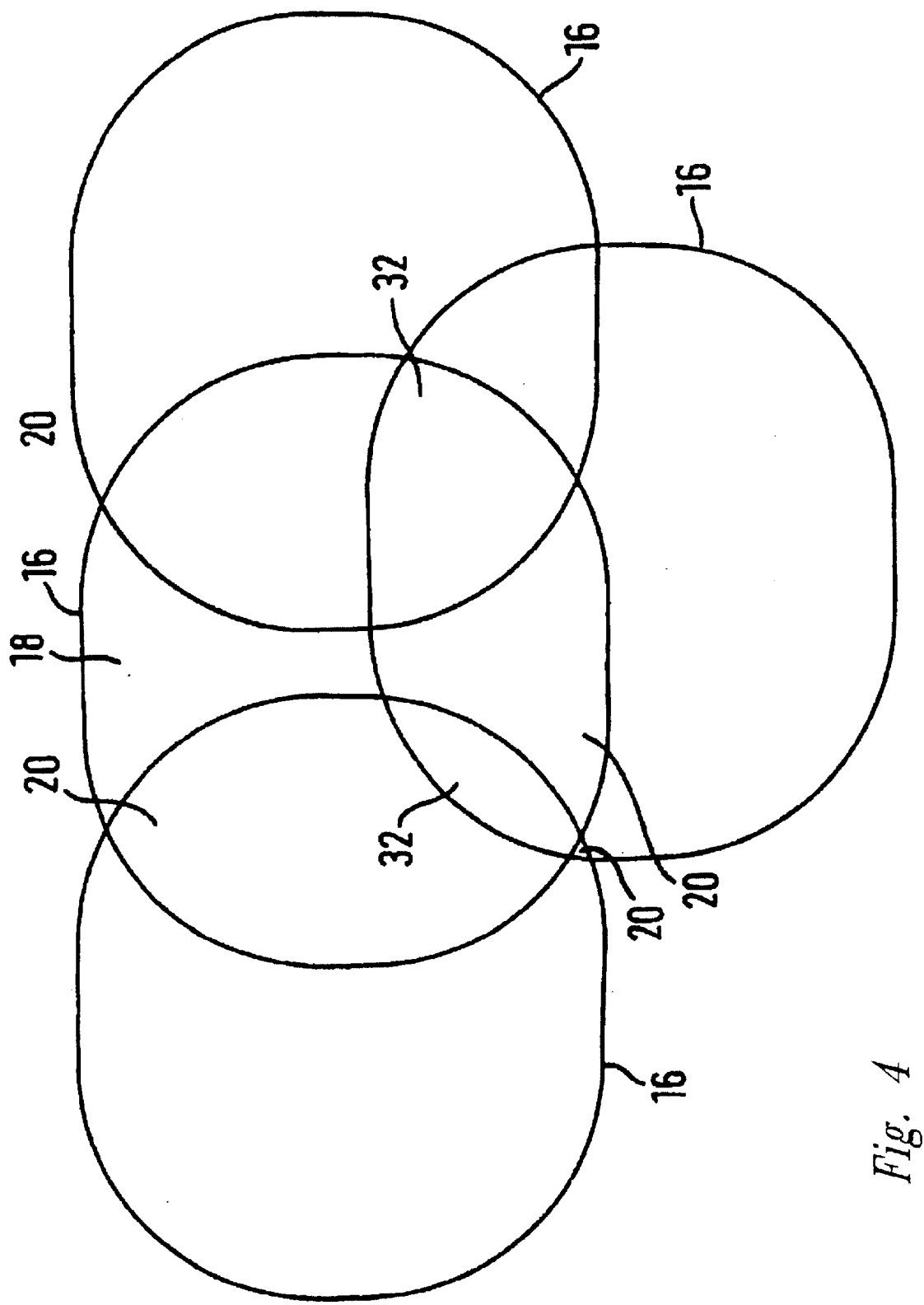
FIG. 4 shows how the cones of radio coverage, shown in FIG. 3 may interact with the surface of the earth to produce many types of different regions.

FIG. 4 shows how the cones 16 of radio coverage may interact with the surface of the earth to produce many types of different regions.

As discussed with reference to FIG. 1, numerous cones or radio coverage 16 may overlap to produce first areas 18 where there is radio coverage by only one satellite, second areas 20 where there is radio coverage by two satellites, and even fourth areas 32 where coverage is provided by three or more satellites. It is to be understood that each of the cones 16 of radio coverage represented in FIG. 4 is divided, as shown in FIG. 3, into its own independent set of spot beams 30.

Figure 5:
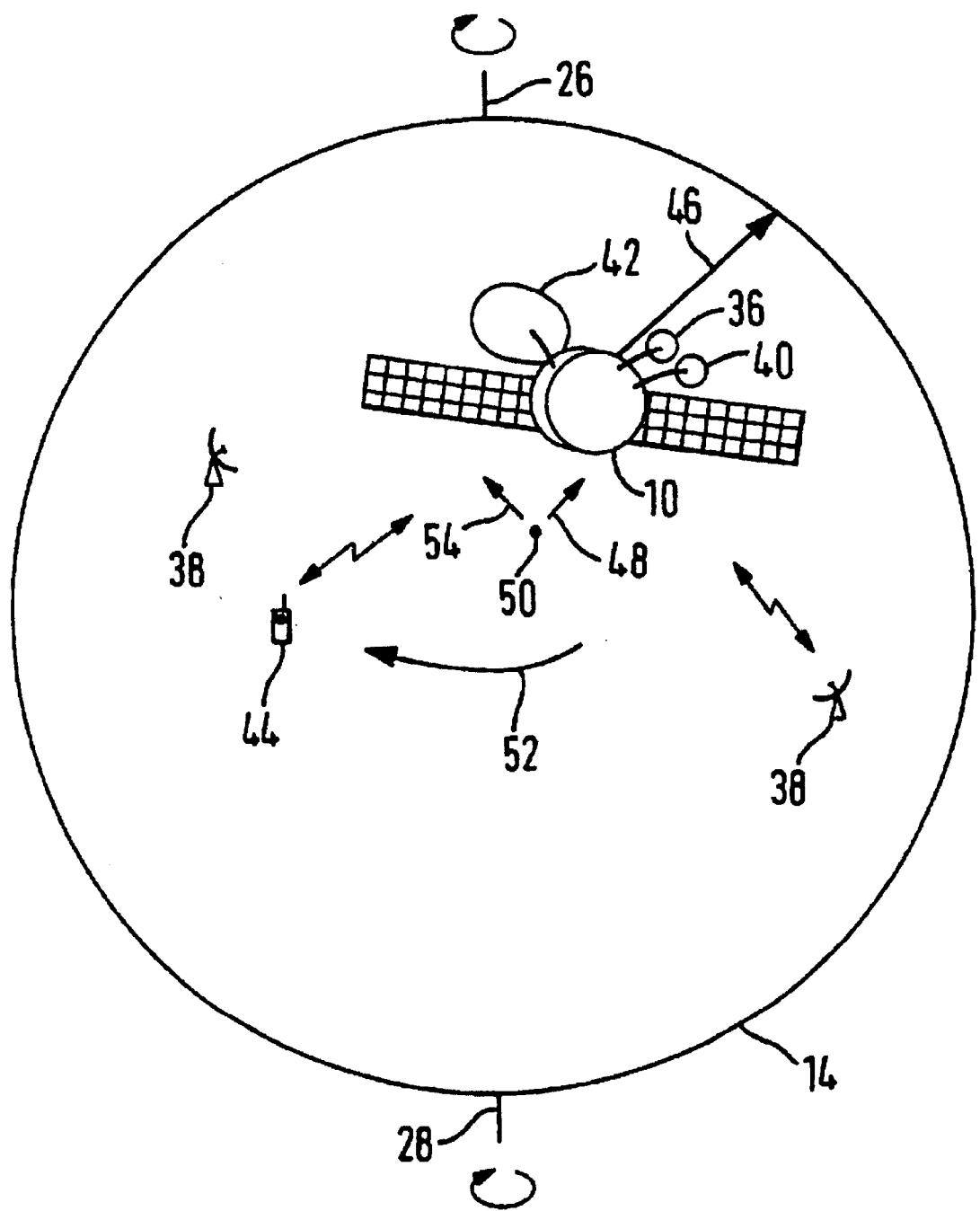
FIG. 5 is a view, from above, of a satellite above the surface of the earth, illustrative of the various motions relative to the earth.

FIG. 5 is a view, from above, of a satellite 10 above the surface of the earth.

The satellite 10 comprises solar panels 34 for power supply, a downlink antenna 36 for sending bulk telephone traffic to one of a plurality of earth stations 38, and uplink antenna 40 for receiving general traffic from the earth stations 38, and a subscriber antenna 42 which provides the plurality of spot beams 30, shown in FIG. 3, intended to provide communications with user terminals 44 which may be provided in a form not dissimilar to a hand held cellular radio telephone. It is to be understood that the user terminal 44 may also comprise more elaborate vehicle mounted equipment for use in land vehicles, ships and aircraft.

With the parameters mentioned in this preferred example, the satellite moves around its orbit 12 12', as indicated by a first arrow 46, with a velocity of 4.9 km per second. Ignoring for the moment the rotation of the earth 14, the spot beams 30 also move across the surface of the earth 14 with a similar velocity along a ground track as indicated by a second arrow 48. The point immediately beneath the satellite, is known as the nadir 50.

At the same time the earth 14 is rotating, at its equator with a velocity of 0.47 km per second, as indicated by a third arrow 52. Directions, relative to the ground track 48, at 90 degrees thereto, are termed crosstrack as indicated by a fourth arrow 54. Hereinafter, the position of the user terminal 44 is defined with reference to its distance along the ground track 48 and its distance along the cross track 54 with reference to the nadir 50.

Figure 6:
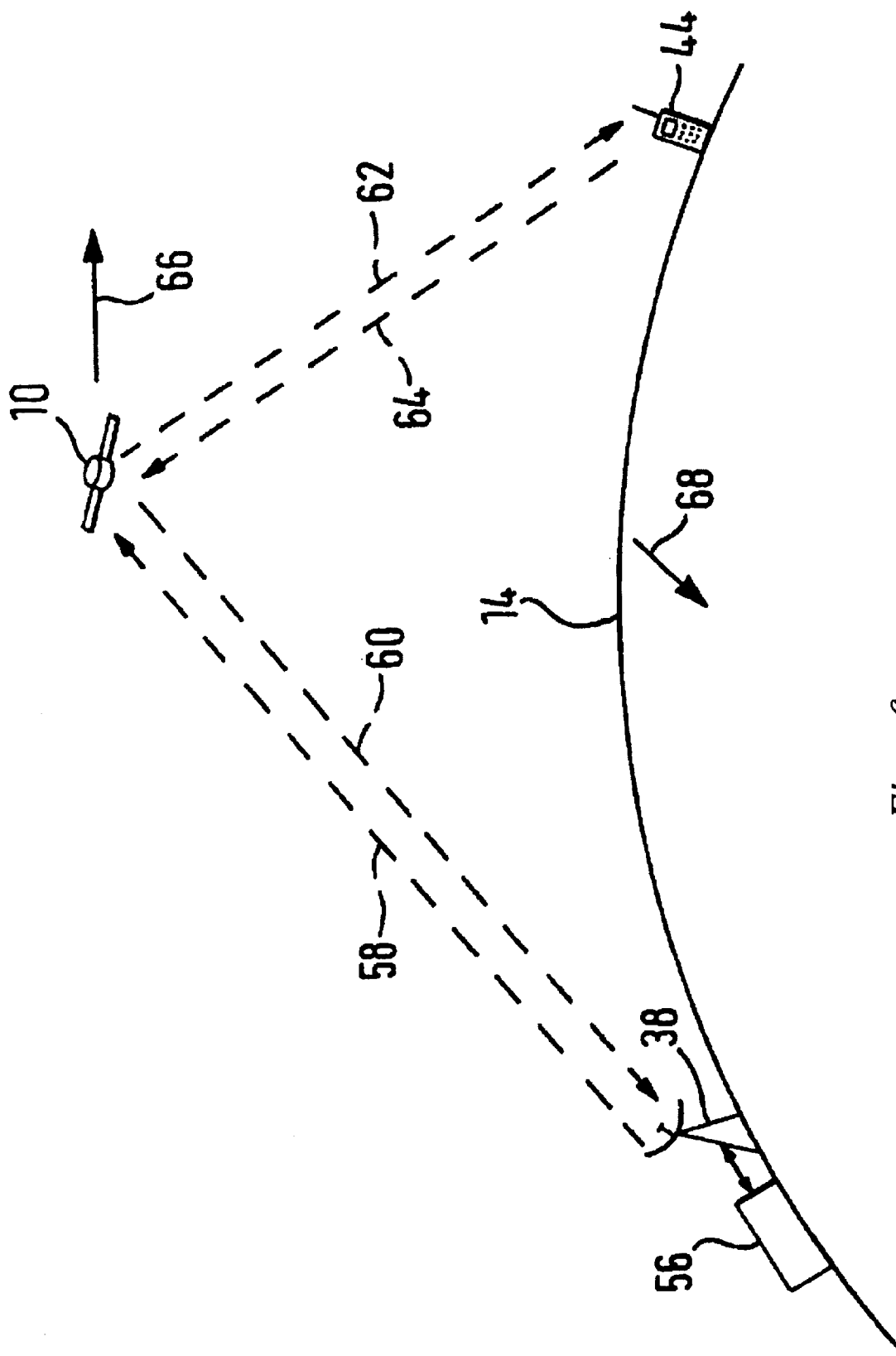
FIG. 6 is a schematic view of the general situation where an earth station talks to a user terminal via the satellite to determine propagation delays between the user terminal and the satellite.

FIG. 6 is a schematic view of the general situation where an earth station 38 talks to a user terminal 44 or via the satellite 10.

The earth station 38 further comprises an earth station controller 56 which controls the activity of the earth station 38. The earth station 38 is located at a first point on the surface of the earth 14 and the user terminal 44 may be at any other point on the surface of the earth within range of the satellite 10 when the satellite 10 is in range of the earth station 38.

The earth station 38 communicates with the satellite 10 via an uplink radio link 58, via the uplink antenna 40 of FIG. 5, using frequencies in the band 5150 to 5250 megahertz. The earth station 38 receives signals from the satellite 10 via the downlink antenna 36 of FIG. 5 on a downlink radio link 60 using signals in the frequency range 6975 to 7075 megahertz.

The user terminal 44 receives signals from the satellite 10 via a user terminal downlink 62 using frequencies in the range 2170 to 2200 megahertz. The user terminal 44 sends messages and signals to the satellite 10 via a user terminal uplink 64 operating in the frequency band 1980 to 2010 megahertz. These frequencies are merely exemplary and those skilled in the art will be aware from the following description, that the invention could be practised using numerous other frequencies for the uplinks and downlinks.

Implicit in FIG. 6, but not specifically shown, is the fact that satellite 10 contains its own precise oscillator, conveniently in the form of a crystal oscillator, which the satellite 10 uses for converting the frequencies of incoming and outgoing signals and for use as a frequency reference when synthesising frequencies. Likewise, the user terminal 44 contains its own internal synthesised oscillator, working from a master oscillator, preferable a crystal oscillator, for converting frequencies of incoming signals and synthesising the frequencies of outgoing signals.

Equally, the earth station 38 and the earth station controller 56 between them contain, or have access to, extremely precise frequency references and time references. These references may actually be contained within the earth station 38 and the earth station controller 56, or may be derived from elsewhere via a land line or other service.

The exact location, on the surface of the earth 14, of the earth station 38, is known with great precision. Likewise, the parameters or the orbit 12 12' of the satellite 10 and its position in that orbit, at any instant, are also known with great precision. The uncertain element, which is the purpose of the present invention to resolve, is the position of the user terminal 44 on the surface of the earth 14.

Not previously mentioned, is the fact that the user terminal 44 transmits on the user terminal uplink 64 to the subscriber antenna 42 and similarly receives on the user terminal downlink link 62 from the subscriber antenna 42. The satellite 10 will only be in communication with one earth station 38 at a time, but may be in communication with a great many user terminals 44. Each user terminal will be in one particular spot beam 30 of the plurality of spot beams shown in FIG. 3.

The satellite 10 will be moving relative to the surface of the earth 14, and therefore relative to the earth station 38 and to the user terminal 44, as indicated in a fifth arrow 66. Likewise, the surface of the earth 14 will be moving relative to the orbit 12 12' of the satellite 10 as generically indicated by a sixth arrow 68.

The signals exchanged between the earth station 38 and the satellite 10, in common with the signals exchange between the user terminal 44 and the satellite 10, all enjoy a propagation delay and a frequency shift, due to the motion of the satellite 10 relative to the earth station 38 and to the user terminal 44 caused by the doppler effect. The present invention in part concerns itself with means of employing the doppler shift in frequencies, due to the motion of the satellite 10, and measurement of the propagation delay, to determine the position of the user terminal 44 on the surface of the earth 14.

In the present invention, propagation delay is measured between the earth station 38 and the user terminal 44. The earth station 38 sends out a signal on the uplink radio link 58 to the satellite 10 which is, in turn, sent to the user terminal 44 via the user terminal downlink 62. Upon receipt of the signal from the earth station 38, the user terminal waits for a predetermined period and then sends its own message, via the user terminal uplink 64 and the downlink radio link 60, back to the earth station 38. The earth station controller 56 notes the elapse of time from the instant that the earth station 38 began to transmit the message on the uplink radio link 58 and the instant when the earth station 38 began to receive the response message from the user terminal 44 from the downlink radio link 60. The earth station controller 56 knows the propagation delay times for signals, through the satellite 10, from the uplink radio link 58 onto the user terminal downlink 62 and, correspondingly, the propagation delay through the satellite 10 between the user terminal uplink 64 and the downlink radio link 60. Equally, the earth station controller 56 knows, with precision, the predetermined elapsed time employed by the user terminal 44 before it responds to the received message from the earth station 38. These propagation delays and the predetermined delay of the user terminal 44 are subtracted, by the earth station controller 56, from the overall elapsed time to determine the actual propagation delay of the radio wave via the various links 58, 60, 62, 64 in the return journey of the message from and to the earth station 38. The radio wave propagates always at the speed of light, which is constant. Because the position of the earth station 38, on the surface of the earth, is precisely known, and because the position of the satellite 10 in its orbit 12 12' is also precisely known, the sum of the propagation delays on the uplink radio link 58 and the downlink radio link 60 can be precisely calculated. The earth station controller 56 is already aware of the over all elapsed time for the propagation of the message along the radio paths 58, 60, 62, 64. By subtracting the calculated delay on the radio path 58 60 between the earth station 38 and the satellite 10 from the overall propagation delay, the propagation delay between the user terminal 44 and the satellite 10 may be precisely measured. This means that, since the propagation is entirely at the speed of light, the linear distance between the satellite 10 and the user terminal 44 is known. According to the propagation delay, the user terminal may exist on any point of a spherical surface centred on the satellite 10. Because the spherical surface intersects the surface of the earth 14, and the user terminal 44 is on the surface of the earth, the location of the user terminal 44 may be inferred as being on the line intersection of the spherical surface of the earth 14 and the sphere of measured distance centred on the satellite 10.

Figure 7:
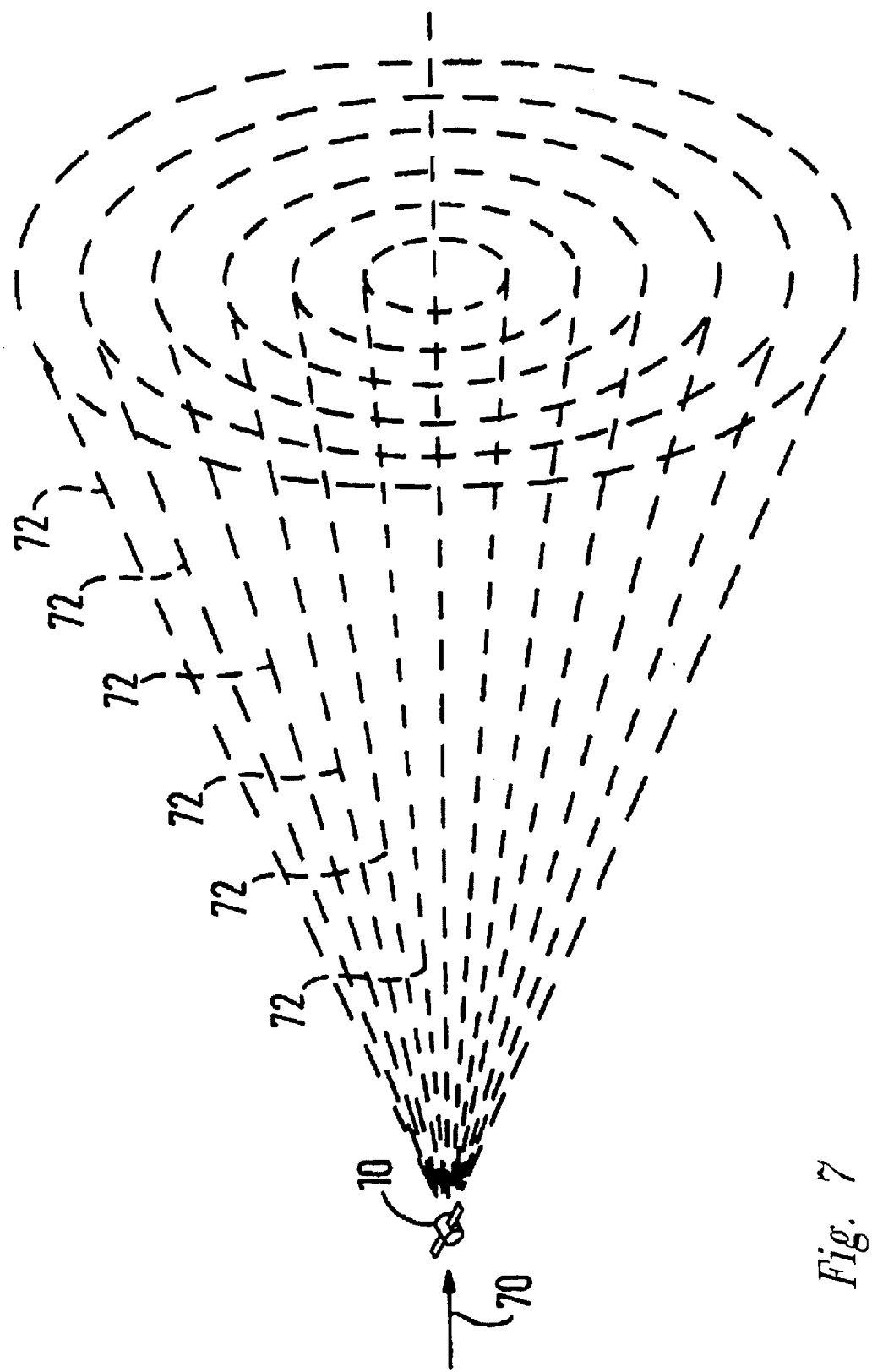
FIG. 7 shows the geometry of doppler frequency shift measurement for the satellite.

FIG. 7 shows the geometry of doppler frequency shift measurement for the satellite 10. As the satellite 10 moves as indicated by a 7th arrow 70, the change in frequency of a radio signal sent from the satellite 10 and the perceived frequency of a radio signal received by the satellite 10 from a fixed source such as the user terminal 44, depends upon the cosin of the angle between the satellite 10 and the recipient of a transmitted radio signal from the satellite or the source of a transmitted radio signal to the satellite 10. Accordingly, if we plot those regions in space for pre-determined doppler frequency changes, there is obtained a series of coaxial cones 72 having the satellite 10 at their collective apex, extending towards infinity, and having, as their collected axis 74, the direction of the motion of the satellite 10 as indicated by the 7th arrow 70. FIG. 7 shows the cones 72 extending only for a finite distance. It is to be understood that the cones 72 are of infinite extension. Likewise, FIG. 7 has only shown the cones "in front" of the satellite for radio frequencies receivers or sources which the satellite 10 is approaching. It is to be understood that a corresponding set of coaxial cones 72 extend "behind" the satellite, having the same apex and axis. The doppler shift "in front" of the satellite 10 is shown by an increase in frequency. The doppler shift "behind" the satellite 10 is provided by a corresponding decrease in frequency.

Where the cones 72 cut the surface of the earth 14, for a particular doppler frequency shift, defines a further line along which the user terminal 44 may be located.

Referring again to FIG. 6, a doppler frequency shift measurement is executed by the earth station 38 providing a signal of known frequency on the uplink radio link 58. The satellite 10, using its own internal oscillator, translates the frequency of the signal and provides it on the user terminal downlink 62. The user terminal 44 then returns the signal via the user terminal uplink 64, once again to be converted in frequency by the internal oscillator of the satellite 10 and sent back to the earth station 38 via the downlink radio link 60. The earth station controller 56 measures the frequency of the downlink radio link 60 signal and deduces the doppler frequency shift, at the user terminal 44, resulting from the motion of the satellite 10 as indicated by the 5th arrow 66.

Figure 8:
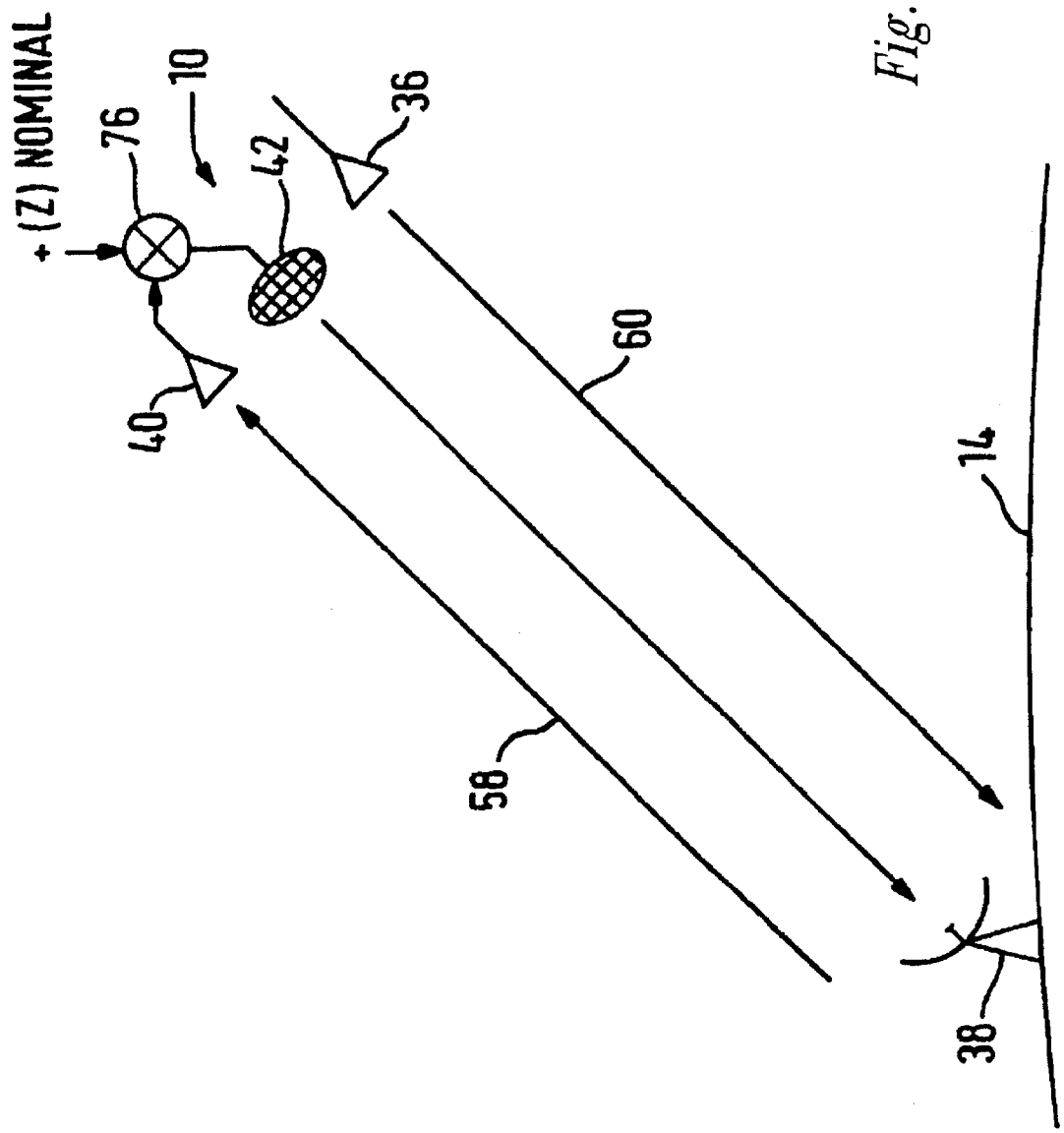
FIG. 8 is a schematic representation of the exchange of test signals between the earth station and the satellite to determine the relative doppler shift and internal oscillator error of the satellite.

FIG. 8 is a schematic diagram of the manner in which the earth station 38 and the earth station controller 56 interact with the satellite 10 to calibrate the errors and doppler shift experienced between the earth station 38 and the satellite 10.

The earth station 38 sends a signal of know frequency f(1) on the uplink radio link 58 to the satellite 10. The satellite 10 has an internal master oscillator which controls all of the synthesised frequencies used by satellite 10. If the master oscillator has a proportional error m, then any frequency, synthesised using the master oscillator, in the satellite, is proportionally in error, so that:

$$f(\text{actual}) = (1+m)f(\text{intended})$$

Likewise, the satellite 10 is moving with respect to the earth station 38, thus introducing a proportional doppler shift, let us call it d, so that, no matter whether the signal goes from the earth station 38 to the satellite 10, or from the satellite 10 to the earth station 38:

$$f(\text{received}) = (1+d)f(\text{sent})$$

Thus, if the earth station sends a frequency f(1) on the uplink radio link 58 to the satellite 10, because of doppler shift the satellite receives a frequency $$f(\text{received at satellite}) = f(1)(1+d)$$

Now, the satellite employs a frequency changer 76 to convert the signal, received from the earth station 38, to a frequency suitable for use via the subscriber antenna 42. In order so to do, the satellite 10 synthesises an intended frequency f(2) to be subtracted from frequency of the signal received at the satellite 10 from the earth station 38. The intended frequency f(2) is subject to the proportional error in the master oscillator on the satellite 10, and so becomes f(2)(1+m).

The output of the frequency changer 76 is thus:

$$f(1)(1+d) - f(2)(1+m)$$

and this is sent, back to the earth station 10, via the subscriber antenna 44. But the satellite 10 is moving, and thus imparts a further doppler shift. Thus, the frequency, received by the earth station 38 from the subscriber antenna 42, let us call it f(R1), is given by $$f(R1) = (1+d)(f(1)(1+d) - f(2)(1+m))$$

The earth station controller 56 measures f(R1) with extreme precision. Thus, f(R1), f(1) and f(2) are all known numbers, but m and d are unknown. Expanding the expression for f(R1) we obtain $$f(R1) = (f(1) - f(2)) + d(2f(1) + d^2 f(1)) - mdf(2) - f(2)m$$

The second order terms $d^2 f(1)$ and $mdf(2)$ are insignificant compared to the other terms, and can be ignored.

$$\text{Thus } f(R1) = f(1) - f(2) + d(2f(1) + (2) - mf(2))$$

The satellite 10 synthesises a third signal, with frequency f(3), which it sends via the downlink radio link 60 to the earth station 38. The third signal f(3) is subject to the proportional error of the master oscillator in the satellite 10. Thus, the actual frequency sent on the downlink radio link 60 becomes:

$$(1+m)f3$$

Since the satellite 10 is moving, the signal on the downlink radio link 60 is also subject to doppler shift. The frequency, f(R2), received at the earth station 38 on the downlink radio link 60 is thus given by:

$$f(R2) = (1+d)(1+m)f(3)$$

$$\text{Thus } f(R2) = f(3) + df(3) + mf(3) + mdf(3)$$

The second order term $mdf(3)$ is very small compared to the other terms and can be ignored. This leaves the following equations.

$$f(R1) = f(1) - f(2) + d(2f(1) - f(2)) - mf(2)$$

$$\text{and } f(R2) = f3(1+d+m)$$

Now, f(1), f(2) and f(3) are precisely know numbers and f(R1) and f(R2) are accurately measured and thus known. This reduces the equations to being two simultaneous equations in two unknowns, namely m and d, which can thus be solved for the unknowns.

Figure 9:
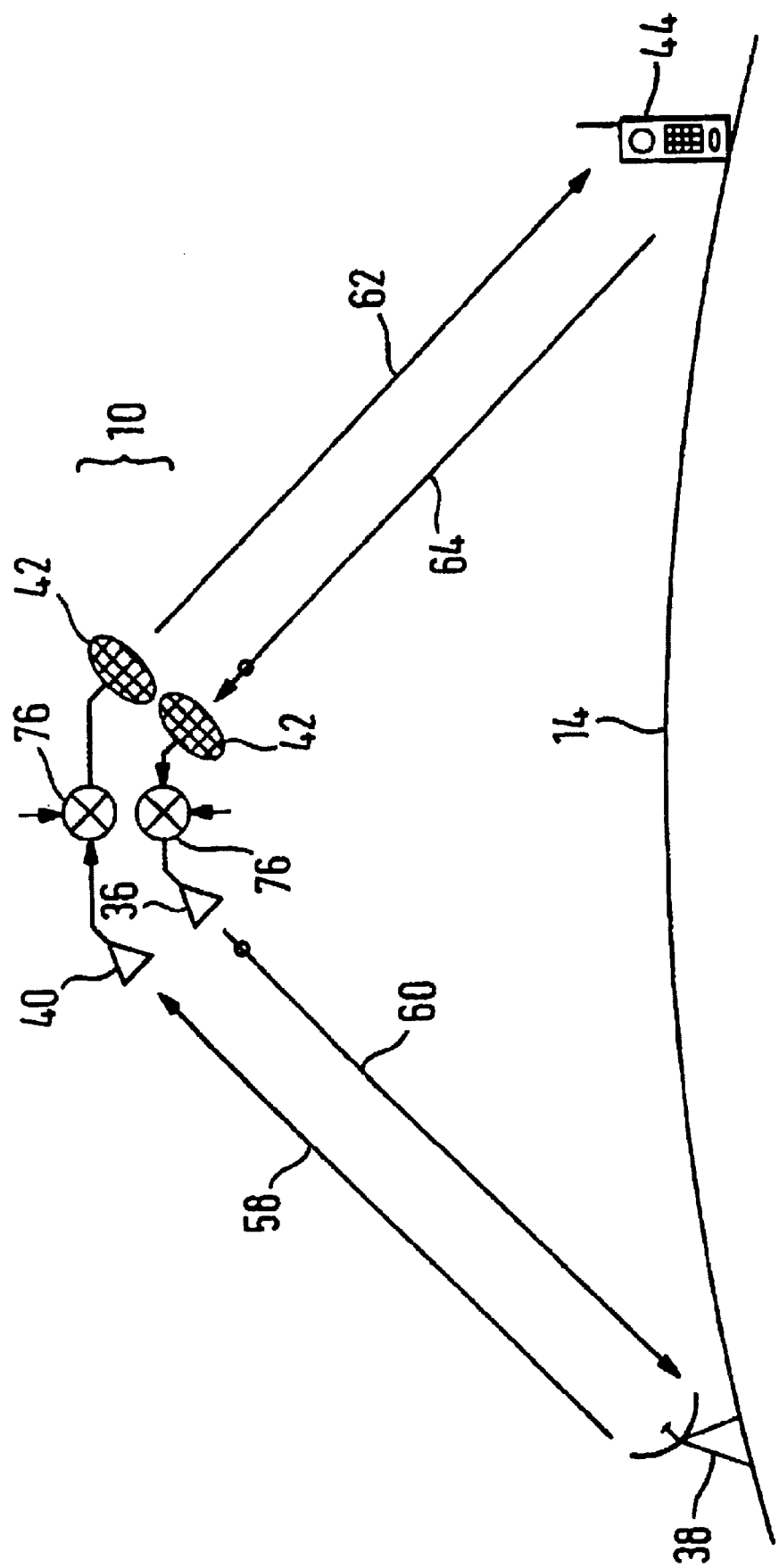
FIG. 9 is a schematic representation of how a calibrated satellite, according to FIG. 8, may, in turn, be used to determine the relative doppler shift between the satellite and user terminal and the internal oscillator error in the user terminal.

FIG. 9 is a schematic view of how the earth station 38 measures the proportional doppler shift error and master oscillator error on the user terminal 44.

The earth station 38 and the earth station controller 56 first 'calibrate' the satellite 10 as described with reference to FIG. 8. Being able to predict the behaviour the satellite 10, the earth station 38 effectively moves its point of operation from the surface of the earth 14 and places it at the satellite 10. The satellite 10 will show a different doppler shift with respect to the earth station 38 than it displays with respect to the user terminal 38.

The subscriber antenna 42 and the frequency changer 76 are shown twice in the satellite 10 simply to indicate that two paths exist, where the earth station 38 receives signals from the user terminal 44 via the satellite 10 and the earth station 38 sends signals to the user terminal 44 via the satellite 10.

Firstly, the earth station 38 sends a signal on the uplink 58 which is transposed by the frequency changer 76 and sent down on the user terminal downlink 62 to the user terminal 44. The user terminal 44 makes a measurement of the signal on the user terminal downlink 62, transposes its frequency by a nominal fixed amount and resends the transposed signal on the user terminal uplink 64 to the satellite 10 via the subscriber antenna 42 to be transposed via the mixer 76 and sent, via the downlink radio link 60, to the earth station 38 where the earth station controller 56 makes an accurate frequency measurement. The user terminal 44 also makes an independent transmission, via the satellite, as described, at a nominal frequency, known to the earth station 38 and its controller 56.

A moment of reflection will show that precisely the same method has been used by the earth station 38, extended via the 'calibrated' satellite 10, to measure the errors of the user terminal 44, as the earth station 38 used to 'calibrate' the satellite. There has been one loop—back frequency measurement, and one independent signal at a nominal synthesised frequency. The earth station controller 56 corrects for the 'calibration' of the satellite, and once again works out the two equations in two unknowns to solve for the satellite 10 to user terminal 44 doppler shift and to solve for the proportional error in the master oscillator in the user terminal 44.

Figure 10:
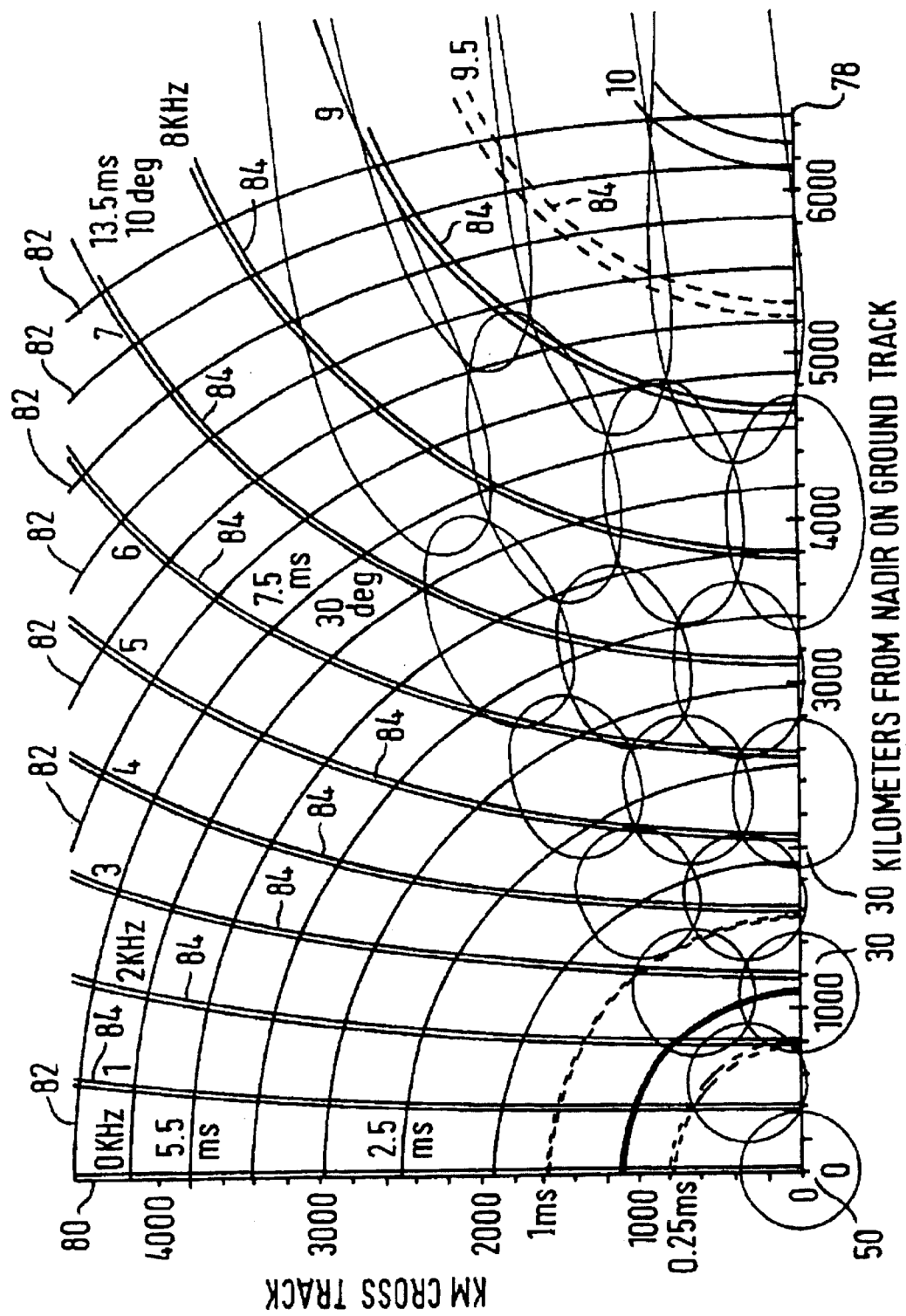
FIG. 10 shows how intersecting lines of measured doppler frequency shift and propagation delays may be used to measure the position of the user terminal on the surface of the earth.

FIG. 10 shows how measurement of Doppler frequency shift and delays can be used to locate a user terminal 44 on the surface of the earth 14.

In FIG. 10, the horizontal axis 78 corresponds to measurement in the direction of the second arrow 48 of FIG. 5 along the ground track. The vertical axis 80 corresponds to measurement along the cross track as indicated by the fourth arrow 54 in FIG. 6.

Only one quadrant is shown. It is to be understood that the pattern, as shown, is symmetrical about the axes in all four quadrants.

The delay measurements, described with reference to FIG. 6, create a series of delay contours 82, approximating to circles centred on the nadir 50 which corresponds to the point 00 in FIG. 10. Whereas the delay contours 82 represent the intersections of spheres of constant delay centred on the satellite, doppler contours 84 represent the lines of intersection of the plurality of coaxial cones 72 described in relation to FIG. 7. The figures given for the doppler contours relate to the doppler shift, in milliseconds, corresponding to the position, on the surface of the earth 14, where the user terminal 44 might be situated. Likewise, the figures adjacent to the delay contours 82 indicate the particular delay in milliseconds, for that particular delay contour 82 and that was the particular position on the surface of the earth 14. Various figures are shown in degrees, being the angle of elevation from the user terminal 44 to the satellite 10 if it were in that location. FIG. 10 extends out to a minimum elevation of 10 degrees, which, in this instance, is the operational minimal of the satellite communications system which holds the example given as the preferred embodiment of the present invention.

Also shown in FIG. 10, overlaid, are some of the spot beams 30 described with reference to FIGS. 3 and 4. It is to be understood that spot beams 30 fill the entirety of the four quadrants. Only a few spot beams 30 have here been shown to avoid undue cluttering and complication of FIG. 10.

Essentially, on the basis of a single delay measurement as described with reference to FIG. 6, and a single Doppler frequency shift measurement as described with reference to FIGS. 8 and 9, it is possible to estimate the position of the user terminal 44 on the surface of the earth 14 at that point where its particular delay contour 82 and Doppler contour 84 cross.

Because there exist 4 quadrants, there is a degree of ambiguity in determining which of the four quadrants the user terminal 44 might be situated. This is resolved by noting which of the plurality of spot beams 30 received the signal from the user terminal 44.

It is to be observed, in FIG. 10, that the Doppler contours 84 are in fact drawn as a pair of lines rather than a single line. This is to represent the proportional error in the measurement. Close to the nadir 50, the lines in the doppler contour 84 are close together indicating a small positional error. By contrast, at large distances along the ground track shown by the horizontal axis 78, the pairs of lines in the doppler contours 84 become wider apart indicating a greater error. By contrast, although the delay contours 82 are also pairs of lines indicating an uncertainty, in the accuracy of the measurement, the pairs of lines in the delay contours are much closer together.

In order to overcome the rather large errors in the doppler contours 84 at great distances along the ground track as indicated by the horizontal likes of 78, an averaging process in undertaken.

Figure 11:
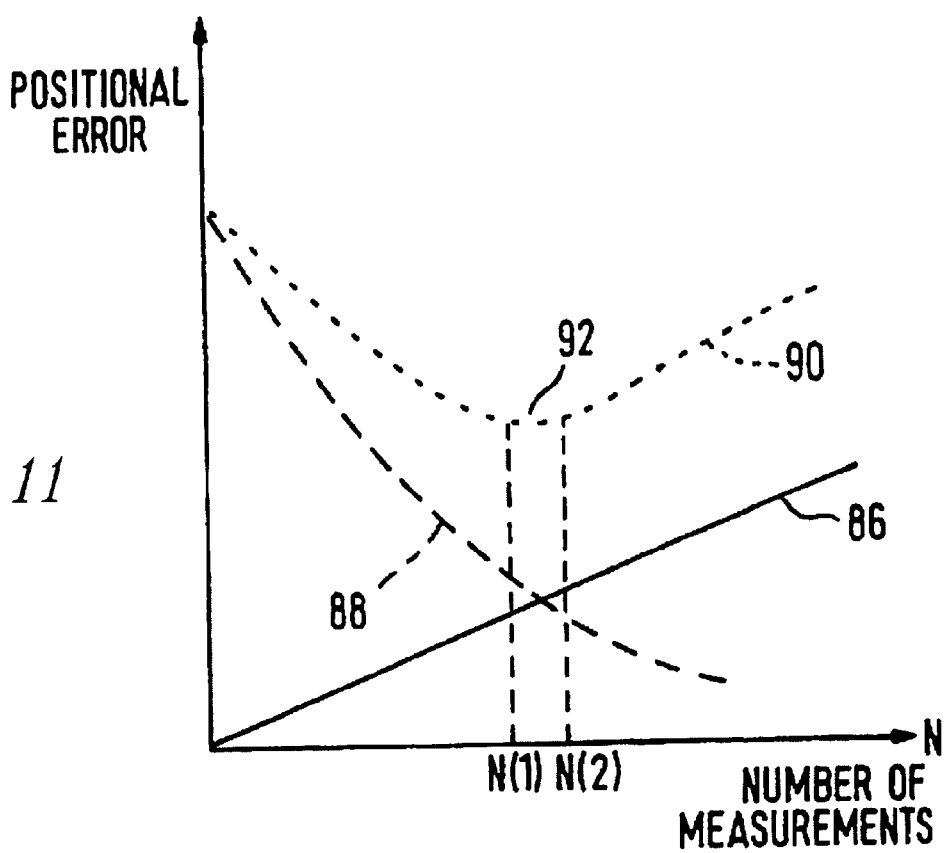
FIG. 11 is a graph showing the derivation of the optimal number of samples for best estimation of position.

FIG. 11 shows a surprising result. If no correction is made for the movement of the earth 14 relative to the nadir 50 of the satellite 10, or of the orbital velocity of the satellite 10 relative to the earth, the actual position of the user terminal 44, as shown in FIG. 11, relative to the satellite 10, steadily increases with time as shown by the solid line 86. Each measurement of the doppler shift and of the delay takes a predetermined period. Accordingly, the positional error as shown by the solid line 86 increases steadily with the number of measurements made.

The positional error, as measured, falls, by well known statistical principles, by the root of the sum of the squares. For example, if a hundred samples are taken, the average error falls to one tenth. If ten thousand samples are taken, the average error falls to one hunndreth. If a million samples are taken, the average error falls to one thousandth, and so on. Broken line 88 indicates the falling rate of measured positional error against the number of samples.

The dotted line 90 represents the sum of the broken line 88 and the solid line 86 indicating the actual positional error against the number of samples. It is to be noted that there is a minimum region 92 where the measured positional error is at its least, fewer numbers of measurement producing a greater measured positional error, and greater numbers of measurements also producing a greater measured position error. It is to be observed that the minimum region 92 is quite flat and there are a range of values N(1) to N(2) between which the measured positional error is more or less at a minimum. An optimum number of numbers of measurements may thus be selected between the numbers N(1) and N(2) which will give the best positional estimation. The exact number of optimum measurements depends very much upon the initial measurement error. Returning, briefly, to FIG. 10, the slope of the broken line 88 representing the improvement of positional error in terms of the number of measurements taken, being a square root, it is to be observed that the delay contour lines 82 start off with a relatively small error so that, interpreting the graphs of FIG. 11, a relatively small number of measurements would be required to produce an optimum number of measurements. Conversely, the doppler contours 84, along the ground track is indicated by the horizontal axis 78 are relatively large so that the slope of the broken line 88 is relatively shallow, demanding a relatively large number of measurements to achieve a best estimation of positional error.

Figure 12:
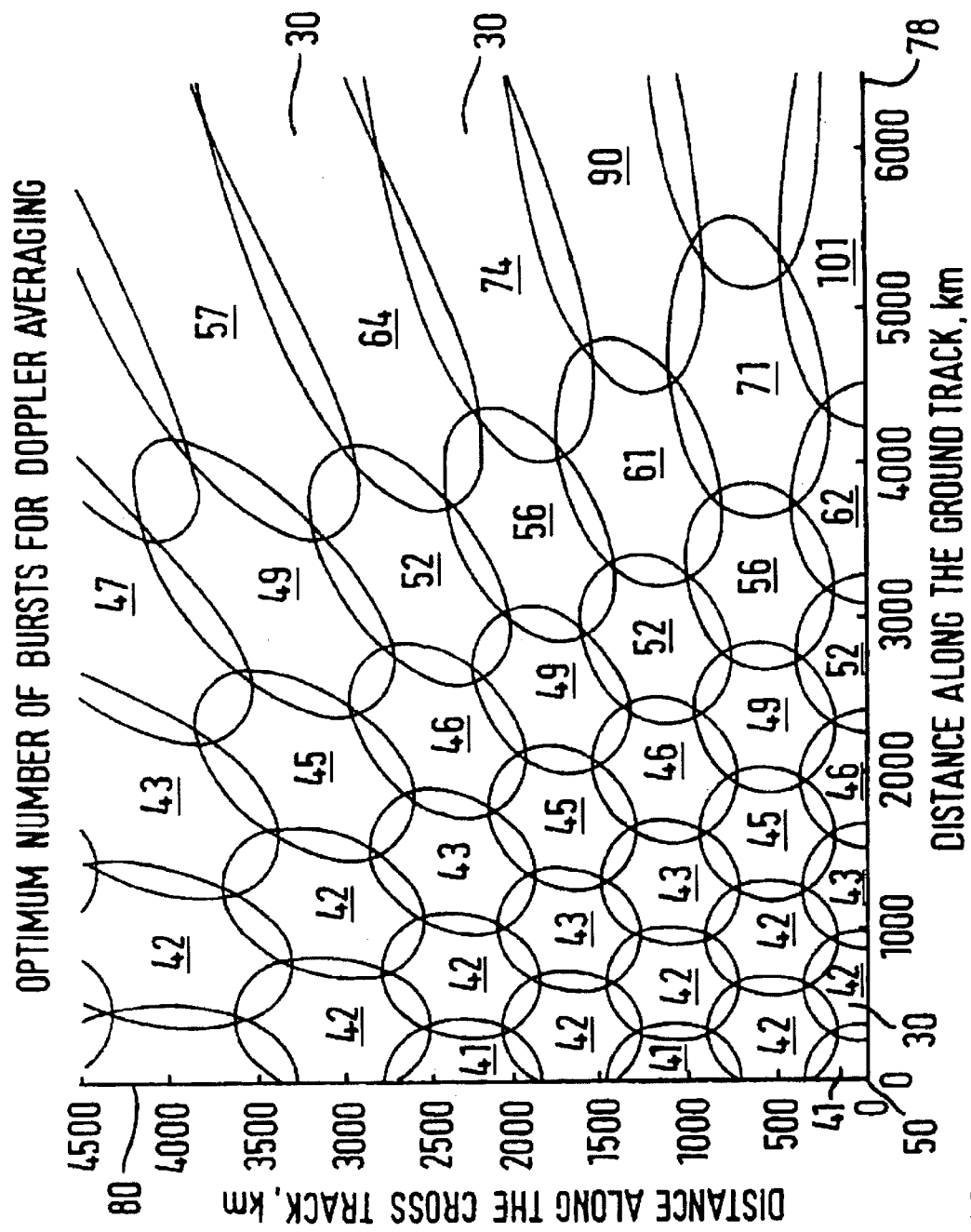
FIG. 12 is a chart showing, for the particular preferred embodiment, the derived optimal number of samples for doppler frequency shift averaging.

FIG. 12 is a first quadrant indication of the optimal number of measurements to be taken for each of the spot beam 30 depending upon the beam in which the user terminal 44 is found, for each of these spot beams 30, for doppler shift measurements, according to the preferred embodiment illustrating the present invention. It will be seen that numbers of optimum measurements range from 90 to 42. If other sampling rates and satellite orbital heights are chosen, other optimum numbers of measurement apply.

Figure 13:
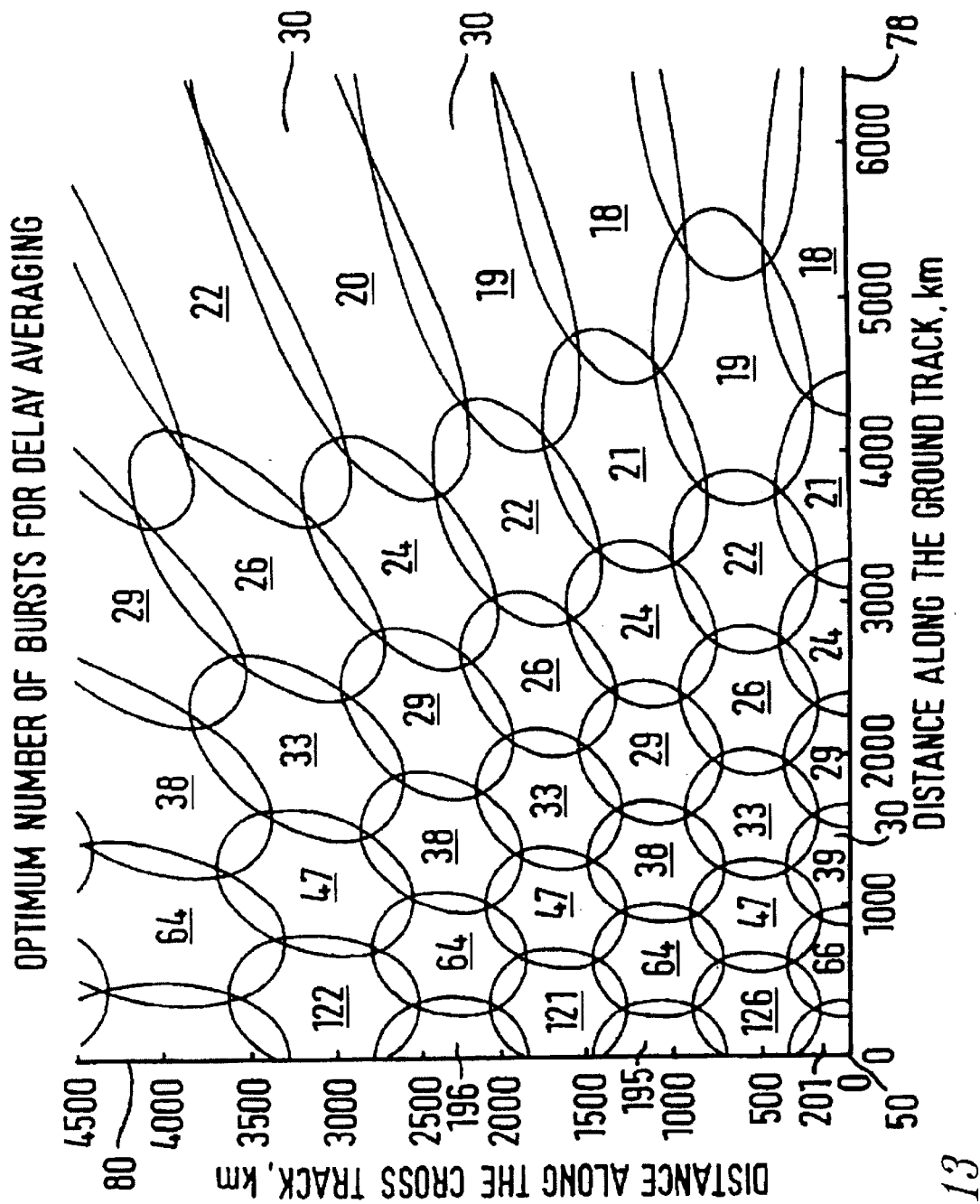
FIG. 13 is a chart showing, for the particular preferred embodiment, the derived optimal number of samples for propagation delay averaging.

Likewise, FIG. 13 shows the optimum number of bursts or samples for each of the spot beams 30 for delay measurements as described with reference to FIG. 6. Surprisingly, the optimum number of samples ranges from 201 near the nadir along the cross track as indicated by the vertical lines 80 and drops to surprising low values at the periphery of the spot beams 30.

The Foregoing description applies to those areas 18, as shown in FIGS. 1 and 4, as having single radio coverage from a satellite 10. The following description applies to those areas 20, shown in FIGS. 1 and 4, where there is multiple radio coverage from the satellite 10.

Figure 14:
FIG. 14 shows the situation where the user terminal has direct access to more than one satellite.
Figure 14:
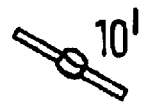
Figure 14:
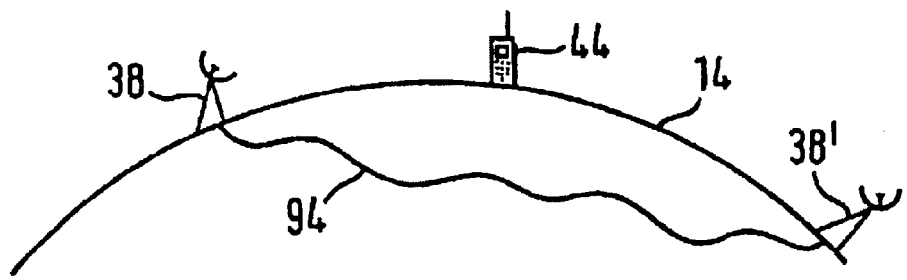

FIG. 14 shows the situation where the user terminal 44 on the surface of the earth 14 has radio coverage from more than one satellite 10. 10'. Ideally, the two satellites 10' should both be visible to the user terminal 44 and to a single earth station 38. However, it is possible that a satellite 10' may be visible of the user terminal 44 but not the single earth station 38. Alternatively, the other satellite 10' will be visible to another earth station 38 '. This is not a problem since both earth stations 38 38' may be joined by a ground communication line 94 where data, derived from the satellite 10 10' and the user terminal may be exchanged for one of the earth stations 38 to act as a master in determining the position of the user terminal 44 on the surface of the earth 14.

If more than one satellite 10 10' is visible, or has been visible in the near past, instead of executing a doppler ranging operation as described with reference to FIGS. 7, 8, 9, 10, 11 and 12, a simple time delay measurement is executed as described with reference to FIGS. 6, 10, 11 and 13. An earth station 38 38' sends a signal to each of the satellites 10 10' and, as previously described, and measures the propagation delay between the satellite 10 10' and the user terminal 44.

As earlier described with reference to FIG. 6, the delay measurements generate, as the possible position of the user terminal 44 relative to the satellite 10, a spherical surface, centred on each of the satellites 10 10' which intersect with each other, and with the surface of the earth 14, to give a unique location for the user terminal 44 on the surface of the earth 14, subject to ambiguity resolution, hereinbefore described. If the user terminal is assumed to be on the surface of the earth, only two satellite propagation delays are necessary for absolute location of the user terminal. If more than 3 satellites 10 10' are so used, the user terminal 44 may be absolutely located in space, also allowing for altitude variations on the surface of the earth 14. It is to be noted, with reference to the description of FIG. 10, that the delay contours 82 are considerably more accurate, particularly at extreme range from the nadir 50 along the ground track as indicated by the horizontal likes of 78, than are the doppler contours 84. Accordingly, the method of measurement of the position of the user terminal 44 on the surface of the earth 14 describe with reference to FIG. 14 is more accurate.

Accordingly, the invention concerns itself with, in what manner, the position of the user terminal 44 is to be determined on the surface of the earth 14. Where only one satellite 10 is visible, the ranging method shown in FIG. 10 is employed. When more than one satellite is visible, the position determined method described in relation to FIG. 14 is employed.

Figure 15:
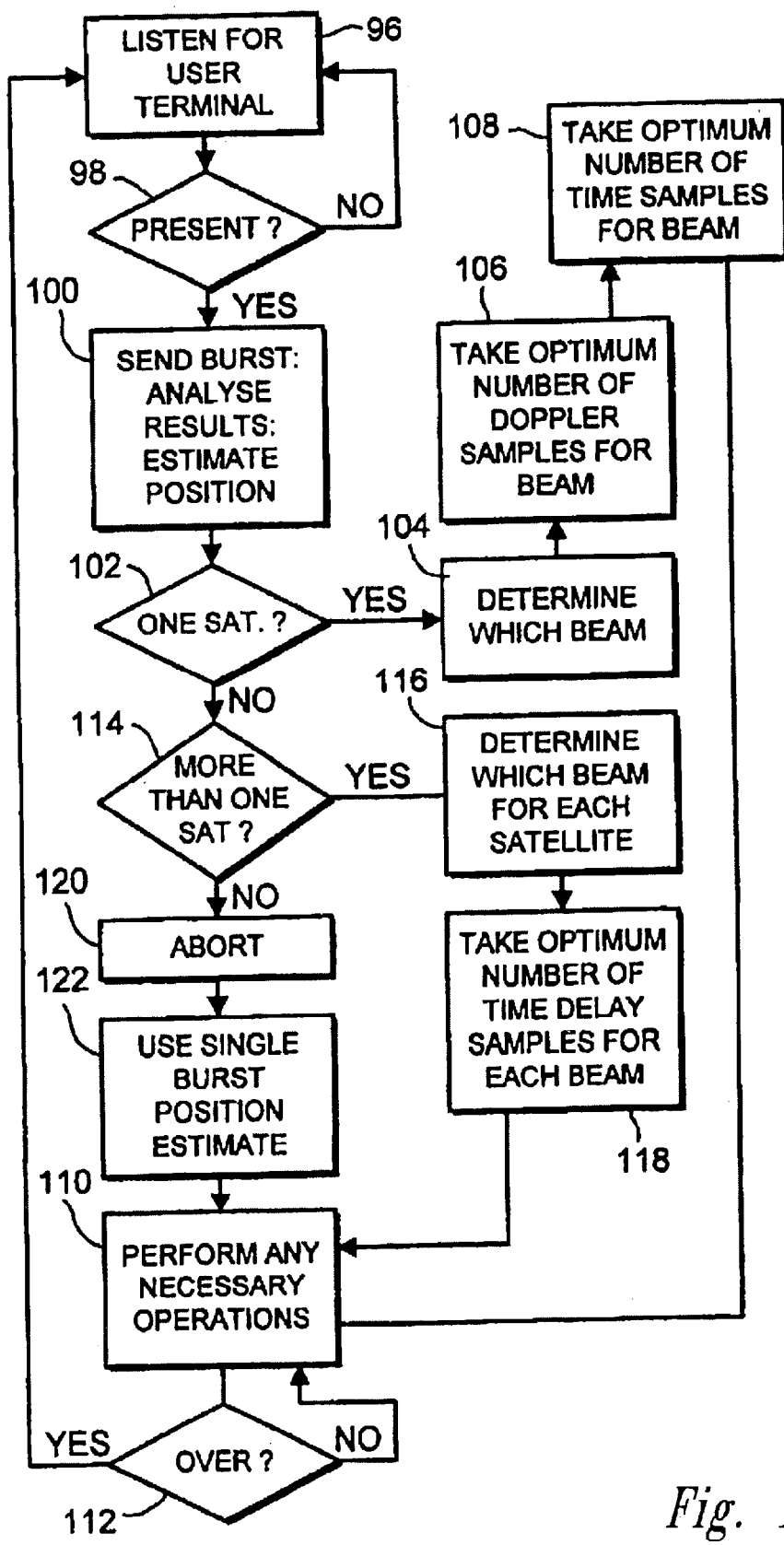
FIG. 15 is a flow chart of the activities of the earth station when determining the position of the user terminal on the surface of the earth employing one satellite, or more than one satellite, if available.

Attention is now drawn to FIG. 15 which shows the activity of the earth station controller 56 in that one of the earth stations 38 38' which executes the position determination for the user terminal 44.

In a first operation 96 the earth station 98 listens for a request of some kind of the user terminal 44. If a first test 98 fails to detect a call from the user terminal 44, control is passed back to the first operation 96. If the first test 98 determines that the earth station 38 has been polled by the user terminal 44, control is passed to a second operation 98. The second operation 98 sends a transmission, via the satellite 10, to the user terminal 44 as described with reference to FIGS. 6, 9 and 10. It is to be presumed that the operation of FIG. 8, where the satellite is "calibrated", has already been executed. If the operation described with reference to FIG. 8 has not been executed, the second operation 100 executes the necessary calibration of the satellite 10.

The second operation 100 also analyses the results from the doppler frequency shift measurement and from the time delay measurement based on one mutual transmission between the earth station 38 and the user terminal 44 to give a guess as to the position of the user terminal 44 on the surface of the earth 44.

The earth station 38, having made an approximate estimate of the position of the user terminal 44, on the surface of the earth, is then in a position to determine whether or not the user terminal 44 will be visible to more than one satellite 10. If a second test 102 decides that only one satellite is visible, control passes to a third operation 104 which determines which one out of the plurality of spot beams 30 is occupied by the user terminal 44. This information may also be known by the earth station 38 based on which of the spot beams 30 the signal from the user terminal 44 was received.

Control passes from the third operation 104 to a fourth operation 106 where, with reference to FIG. 12 on its associated description, depending upon which spot beam 30 is occupied by the user terminal 44, the optimum number of samples by message exchange is executed. This gives the greatest provision in position determination as described with reference to FIG. 11.

When the fourth operation 106 has performed its necessary function, control passes to a fifth operation 108 where delay measurements are made, as described with reference to FIG. 6, for the optimum number of samples for delay measurement as described with reference to FIGS. 11 and 14.

The fourth 106 and fifth operations 108 may be conducted simultaneously, the number of sampling instance being the larger of which ever is greater for doppler shift or delay measurement as shown as reference to FIGS. 12 and 13 for a particular spot beam 30, and the result being analysed for the lesser number only up to the smaller number required, later results being discarded.

The sum of the function of the fourth operation 106 and the fifth operation 108 is to give the best estimate, based on the style of position analysis described with reference to FIG. 10 where spheres of constant time delay and cones of constant doppler shift intersect the surface of the earth 14.

At termination of the fifth operation 108, control is passed to a sixth operation 110 where any necessary communications operation is executed. This may comprise a telephone call, a request for updating of position and status, or whatever else may be required. If a third test 112 depicts that the necessary operation of the sixth operation 110 is terminated, control returns to the first operation 96 where the earth station 38 once again listens for the user terminal 44 through the satellite 10.

Returning to the second test 102, it has been detected that there is just not a single satellite, control is passed to a fourth test 114 which determines if there is more than one satellite present. If the fourth test 114 detects that there is a plurality of satellites 10 available, control passes to a seventh operation 116 where the earth station 38 via the earth station controller 56, determines for which of the plurality of spot beams 30 for each satellite the user terminal 44 is accessible. Thereafter, control passes to an eighth operation 118 where the earth station 38 exchanges the optimum number of radio bursts for each satellite 10 according to FIG. 6 and its associated description, and according to FIGS. 10 and 13 and their associated description. Once the position of the user terminal 44 has been determined by the eighth operation 118, control passes to the sixth operation 110 and thereafter as earlier described, back to the first operation 96.

If the fourth test 114 finds no satellites available, an unusual situation but none the less possible due to environmental blockage, control passes to a ninth operation 120 where the overall operation is aborted. Control then passes to a tenth operation where the earth station 38 assumes the rough position of the user terminal 44 based on the single burst doppler shift and delay measurements executed in the second operation 100.

After the tenth operation 122, control passes to the sixth operation 110 which performs any necessary operations, which, in this instance, might be for the earth station 38 to attempt to establish contact with the user terminal 44, or, perhaps, even to do nothing.

Control then passes back to the first operation 96.

Figure 16:
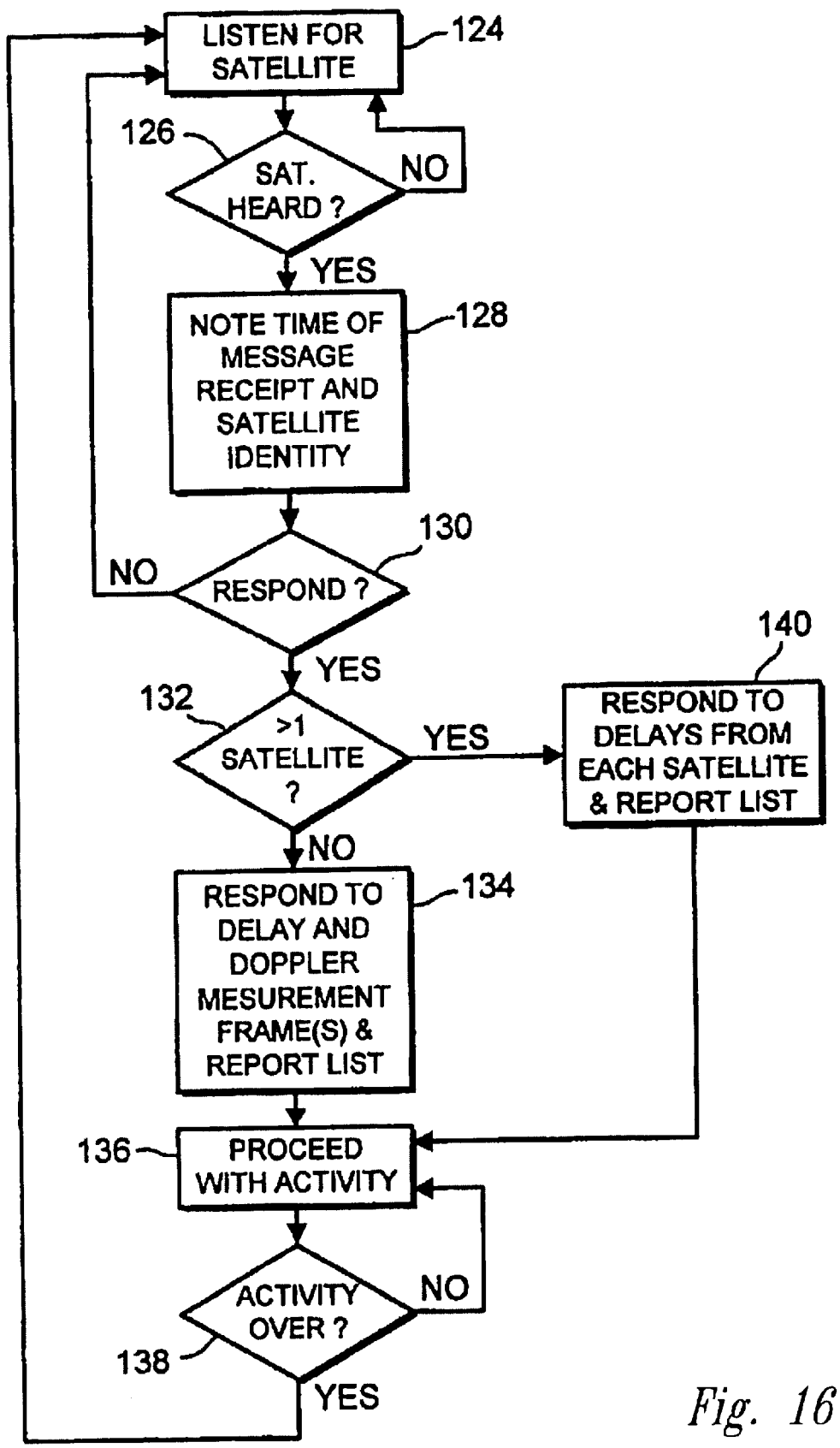
FIG. 16 is a flow chart showing how the earth station can incorporate timed broadcasts in determining the position of the user terminal on the surface of the earth.

FIG. 16 shows the activity of the user terminal 44 as it co-operates with the earth station 38 in yet a further alternative for locating the user terminal 44 in the surface of the earth 14.

The individual satellites 10, at periodical intervals, send out broadcast messages, on all of the spot beams 30, intended to be received by all user terminals 44. The broadcast message, from each satellite, originates originally, from an earth station 38 and contains information which identifies from which satellite the broadcast message is emanated. The time of transmission of the broadcast message is accurately known because, as described with reference to FIG. 6, the earth station is aware of the precise distance between itself and the satellite 10. Equally, as shown in FIG. 14, different earth stations 38' can instruct different satellites 10' to provide a broadcast message. Each earth station 38' is aware of the position of the satellite 10 at all times and will also be aware of the identity of the earth station 38 38' from which the broadcast message originated. As an alternative, the broadcast message can also include indication from which earth station it originated.

In any event, it is merely necessary to note the time of arrival of a broadcast message at a user terminal 44, and to know from which satellite 10 it originated, in order, effectively, to do a ranging "propagation delay" measurement on the user terminal 44 from the satellite 10. Once again, a sphere of fixed delay, in terms of distance, describes the potential locus of the user terminal 44 about the central satellite 10, and the user terminal 44 can lie on the line of intersection of the sphere centred on the satellite 10, with the surface of the earth 14.

Returning once again to FIG. 16, the user terminal, in an 11th operation 124, listens for the broadcast messages from the satellites 10 until a fifth test 126 detects that a satellite has been heard. Control then passes to a 12th operation 128 where the user terminal, using an internal clock, notes and stores the instant of receipt of the message from the satellite 10 together with the identity of the particular satellite 10 from which the message originated. The user terminal 44 keeps a record of the last several satellites 10 to be heard.

Control then passes to a sixth test 130 which checks to see if the user terminal 44 is required to respond to the satellite 10. If no response is required, control passes back to the 11th operation 124 where the user terminal once again listens for broadcast messages from the satellite 10.

If the sixth test 130 determines that the user terminal 44 is required to respond in some manner, perhaps for communications or registration purposes, control passes to a seventh test 132 which checks to see if only one satellite 10 is visible, or more than one satellite 10 is visible. This can be established from the list compiled in the 12th operation 128.

If the seventh test 132 detects that there is only one satellite visible, control passes to a thirteenth operation 134 where the user terminal 44 responds to delay and doppler measurements as indicated with reference to FIGS. 6 to 13. The user terminal 44 also sends, to the earth station 38 the list of times and identities of heard satellites 10 which was accumulated by the 12th operation 128.

The earth station controller 56 then combines all of these measurements and will know the position of the user terminal 44 on the surface of the earth 14. Control next passes to a fourteenth operation 136 where the user terminal 44 proceeds with whatever activity is required of it until an eighth test 138 detects that the activity is over and passes control back to the eleventh operation 124 where the user terminal 44 listens for messages from the satellites 10.

If the seventh test 132 detects that more than one satellite present, control passes to a fifteenth activity 140 where the user terminal 44 responds to a propagation delay measurement from each of the satellites 10 10' as described with reference to FIGS. 14 and 15. The user terminal 44 also reports, to the earth station 38, the contents of the list accumulated in the twelfth operation 128 during the time of receipt and identity of satellite broadcast messages.

At this point, the earth station 38 with which the user terminal 44 is interactive will have sufficient information to determine the position of the user terminal 44 along the surface of the earth 14.

The fifteenth activity 140 having being completed, control passes to the fourteenth activity 136 which proceeds with whatever activity the user terminal is required to perform and then, via the eighth test 138, returns control to the eleventh operation 124 where the user terminal 44 continues to listen to broadcast messages from satellites 10.

It is to be noted that, if there are sufficient readings listed by the twelfth operation 128 and the user terminal 44 has not been moving any significant distance over time, then the position of the user terminal 44 on the surface of the earth 14, may adequately and accurately be measured simply on the basis of the record accumulated by the twelfth operation 128 thus dispensing with the necessity in the fifteenth activity 140 to measure delays from each visible satellite or, in the thirteenth activity 134 to perform a doppler measurement together with a delay measurement.

Equally, in the thirteenth activity 134, if the combined propagation delay and Doppler frequency shift measurement produces a location which roughly corresponds to the location resulting from intersection of the spheres of constant delay as determined from the list of broadcast receipt times and satellite identities as collected by the twelfth operation 128, and this latter determination is more accurate, then the earth station 38, through its earth station controller 56, can opt to use the latter determination.

Another extremely significant element of the compilation of the list by the twelfth operation 128 and its being reported by the thirteenth operation 134 and the fifteenth activity 140 is very simply that the position of the user terminal 44 on the surface of the earth, can be measured using satellites 10 which are no longer visible to the user terminal 44. This is in contrast to all other methods which require that a satellite 10, used for a position determination, should be visible to the user terminal 44.

The user terminal 44 comprises an internal clock. This clock, of course, has relative inaccuracies. The earth station 38, in combination with the earth station controller 56, possess a very accurate clock. In order for the earth station 38 properly to use the list gathered by the 12th operation 128, it is necessary to correct the errors in the clock on the user terminal. This is very simply done. The earth station 38, at a first known instant, requests the user terminal 44 to indicate the time, on its clock to the earth station 38. The earth station 38 knows the propagation delay between itself and the user terminal 44. The time of response, by the user terminal 44, is thus very accurately known. Having noted what time the user terminal clock believes it to be, the earth station 38 and the earth station controller 56 wait for a predetermined period, perhaps one second, and request that the user terminal 44 once again tells the earth station 38 what time the user terminal thinks it is. The earth station 38 thus has two readings from which the rate of drift of the clock on the user terminal 44 and the accumulated timing error can be determined. The earth station 38, with the earth station controller 56, can thus extrapolate using the known drifts and errors, the times recorded in the list generated by the twelfth operation 128. The corrected times are then compared with the known times of transmission from each satellite 10 of the particular broadcast messages. The earth station controller 56 can then calculate the propagation delay between each satellite and the user terminal. Since the position of each satellite is accurately known, it is possible to determine the range of the user terminal 44 from the particular satellite which did the broadcasting.

The previously described measures can be used singly, multiply or in any combination to determine the location of the user terminal 44 on the surface of the earth 14. If two satellites are visible, the present invention also includes the possibility of using a doppler frequency shift measurement from each of the satellites to determine the position of the user terminal 44.

What is claimed is:

1. A satellite communications system wherein a user terminal is operable to transmit to more than one satellite and each of the satellites is operable to transmit to the user terminal and to send and receive signals from an earth station, wherein the earth station is operable to exchange signals with the user terminal through the satellites and thereafter be operable to analyze the signals to determine the position of the user terminal on the surface of the earth, wherein each of the satellites is operable to provide a broadcast message at predetermined times, the user terminal being operable to measure and record the time of arrival of each broadcast message, the user terminal being operable to report back to the earth station the time of arrival of each received broadcast message, the earth station being operable to compare the reported time of arrival with the predetermined times to calculate the propagation delay between the user terminal and each of the satellites, and the earth station is operable to calculate the position of the user terminal relative to each satellite, based on a knowledge of the actual position of each satellite at the predetermined times.

2. A system according to claim 1 wherein said earth station is operable to send out a message, via each of said satellites, and where said user terminal is operable to return a message within a predetermined time of receipt of the message via said satellites said earth station being operable thereby to calculate the propagation delay between the satellites and said user terminal.

3. A system according to claim 2 wherein said earth station is operative to send said message via each of said satellites an optimum number of times, dependent upon the estimated position of said user terminal with respect to each of said satellites, and to take the average of the propagation delays derived therefrom.

4. A system according to claim 1 wherein said user terminal is operable to detect and record the time of arrival of broadcast messages from the satellites which are no longer in sight and to report the previous broadcast messages to said earth station, said earth station using knowledge of the position of said satellites, no longer in sight, at the time of receipt of the broadcast message by said user terminal to assist in the calculation of the position of said user terminal.

5. A system according to claim 1 wherein said earth station is operable to note the recorded time, reported by said user terminal, between two known intervals and is operable thereby to correct for drift and offset error in a timer in said user terminal.

6. A method for use in a satellite communications system wherein a user terminal is operable to transmit to more than one satellite and each of the satellites is operable to transmit to the user terminal, to send and receive signals from an earth station and to provide broadcast messages at predetermined times, the method including the earth station exchanging signals with the user terminal through the satellites and thereafter analyzing the signals to determine the position of the user terminal on the surface of the earth, the user terminal measuring and recording the time of arrival of each broadcast message, the user terminal reporting back to the earth station the time of arrival of each received broadcast message, the earth station comparing the reported time of arrival with the predetermined times to calculate the propagation delay between the user terminal and each of the satellites, and the earth station calculating the position of the user terminal relative to each satellite, based on a knowledge of the actual position of each satellite at the predetermined times.

7. A method according to claim 6 further including said earth station sending out a message via each of said satellites, and said user terminal returning another message within a predetermined time of receipt of the message via said satellites, the earth station calculating the propagation delay between the satellites and said user terminal.

8. A method according to claim 7 further including sending the message via said each of said more than one satellites an optimum number of times, dependent upon the estimated position of said user terminal with respect to each of said satellites, and taking the average of the propagation delays derived therefrom.

9. A method according to claim 6 including the user terminal detecting and recording the time of arrival of broadcast messages from satellites which are no longer in sight of the earth station and reporting said previous broadcast messages to the earth station, said earth station using knowledge of the position of said satellites no longer in sight, at the time of receipt of the broadcast message by said user terminal to assist in the calculation of the position of said user terminal.

10. A method according to claim 6 including the earth station noting the apparent recorded time, reported by said user terminal, between two known intervals and thereby correcting for drift and offset error in the timer in said user terminal.

11. In a satellite communications system including an earth station configured to exchange signals with a user terminal via a plurality of satellites, the earth station being configured to receive reports of times of arrival at the user terminal of broadcast messages transmitted by the satellites at predetermined times, to compare the reported time of arrival with the predetermined times so as to calculate the propagation delay between the user terminal and the satellites and so determine the position of the user terminal on the surface of the earth.

* * * * *